(12) United States Patent
Kimura

(10) Patent No.: US 7,050,219 B2
(45) Date of Patent: May 23, 2006

(54) LIGHT-MODULATING ELEMENT, DISPLAY ELEMENT, AND EXPOSURE ELEMENT

(75) Inventor: Koichi Kimura, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/484,151

(22) PCT Filed: Jun. 17, 2002

(86) PCT No.: PCT/JP02/06014

§ 371 (c)(1),
(2), (4) Date: Jan. 20, 2004

(87) PCT Pub. No.: WO03/009046

PCT Pub. Date: Jan. 30, 2003

(65) Prior Publication Data

US 2005/0018272 A1    Jan. 27, 2005

(30) Foreign Application Priority Data

Jul. 19, 2001 (JP) .............................. 2001-220044

(51) Int. Cl.
*G02B 26/08* (2006.01)
*G02F 1/1335* (2006.01)
(52) U.S. Cl. ...................... 359/298; 359/290
(58) Field of Classification Search ................ 359/295, 359/290, 291, 298, 320; 385/901, 147, 32, 385/31, 30, 120
See application file for complete search history.

(56) References Cited

U.S. PATENT DOCUMENTS 6,195,196 B1     2/2001   Kimura et al.
6,470,115 B1 *  10/2002   Yonekubo ..................... 385/32

FOREIGN PATENT DOCUMENTS

| JP | 61-128205 A | 6/1986 |
| JP | 8-254719 A | 10/1996 |
| JP | 11-72721 A | 3/1999 |
| JP | 11-142627 A | 5/1999 |
| JP | 2000-66122 A | 3/2000 |
| JP | 2001-75488 A | 3/2001 |
| WO | WO 97/31288 A2 | 8/1997 |

* cited by examiner

Primary Examiner—Scott J. Sugarman
Assistant Examiner—Richard Hanig
(74) Attorney, Agent, or Firm—Sughrue Mion, PLLC

(57) ABSTRACT

Subjects for the invention are to provide a light-modulating element having an elevated energy efficiency while preventing a decrease in contrast at low cost without using a display technique employing a waveguide or lightguide plate, and to provide a display element capable of producing high-quality display images and an exposure element capable of exposure treatment.

In the invention, the light-modulating element comprises: a total-reflection optical member 2 having such a property that at least part of planar incident light introduced into the light-modulating element is totally reflected at an interface (total reflection plane) 22 of a layer constituted by the light-modulating element and the incident light does not substantially go out through the side opposite to the incident-light introduction side; and light-coupling elements 6 which are disposed on the total reflection plane 22 side of the total-reflection optical member 2 and serve to selectively couple with the incident light and take out the same from the total reflection plane 22.

12 Claims, 25 Drawing Sheets

VOLUM HOLOGRAM

DIFFRACTION GRATING
(RELIEF TYPE)

DIFFRACTION GRATING
(REFRACTIVE-INDEX
MODULATION TYPE)

POROUS OBJECT

OBJECT CONTAINING SUBSTANCE WITH DIFFERENT REFRACTIVE INDEX DISPERSED/ DISTRIBUTED THEREIN

LIGHT-DIFFUSING/ LIGHT-SCATTERING OBJECT HAVING IRREGULARITIES ON SURFACE

POROUS OBJECT

OBJECT CONTAINING SUBSTANCE WITH DIFFERENT REFRACTIVE INDEX DISPERSED/DISTRIBUTED THEREIN (OBJECT CONTAINING HIGH- REFRACTIVE-INDEX FINE PARTICLES DISPERSED THEREIN)

LIGHT-DIFFUSING/ LIGHT-SCATTERING OBJECT HAVING IRREGULARITIES ON SURFACE

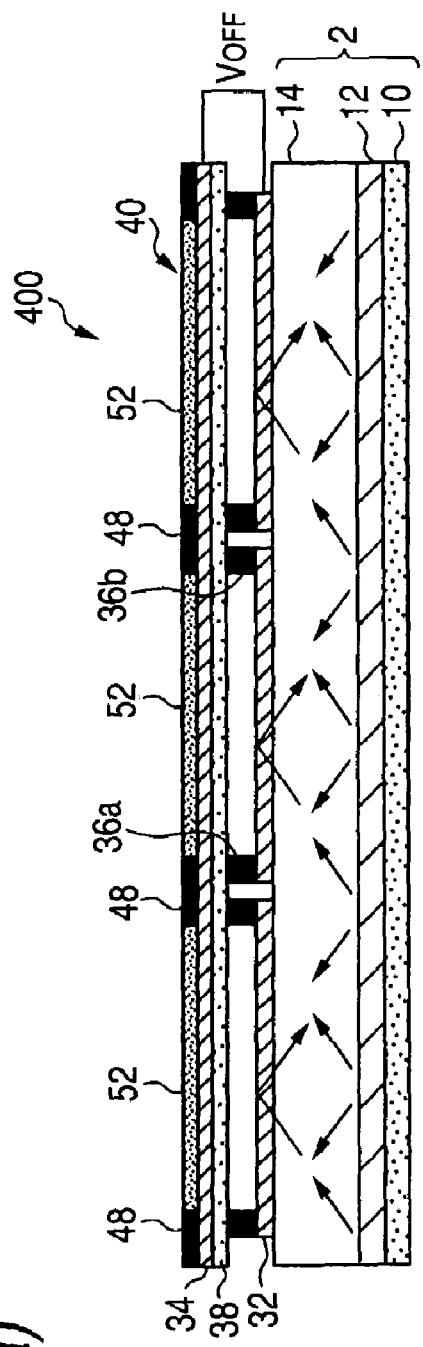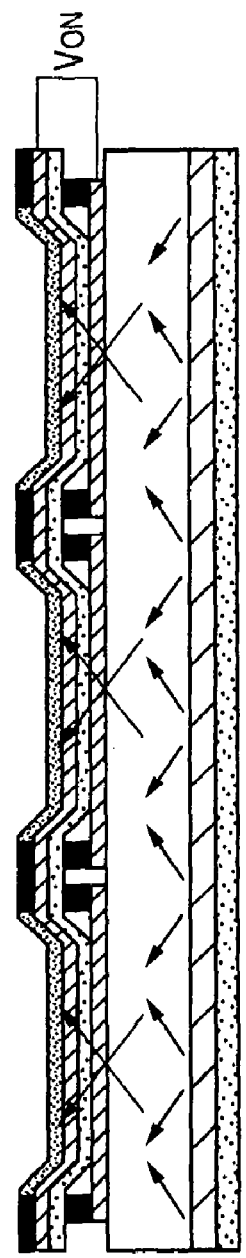
FIG. 16 (a)
FIG. 16 (b)

GROOVE  RIDGE

PLANAR INCIDENT LIGHT

PLANAR INCIDENT LIGHT

INCIDENT LIGHT

CRITICAL INCIDENCE ANGLE c ≃ 40DEG

LIGHT-MODULATING ELEMENT, DISPLAY ELEMENT, AND EXPOSURE ELEMENT

TECHNICAL FIELD

The present invention relates to a flat light-modulating element and display element into which planar incident light is introduced to produce a desired image, and also to an exposure element.

BACKGROUND ART

Among devices in which incident light is regulated with respect to amplitude (intensity), phase, direction of traveling, or the like to process/exhibit an image or patterned data is a light-modulating element. In a light-modulating element, the refractive index of a substance which transmits light is changed by means of an external field applied to the substance and the intensity of the light which finally passes through or is reflected by this substance is controlled through an optical phenomenon such as refraction, diffraction, absorption, or scattering. Examples of this light-modulating element include liquid-crystal light-modulating elements which utilize an electrochemical effect of a liquid crystal. Such liquid-crystal light-modulating elements are being advantageously used in liquid-crystal displays, which are thin flat display elements. Known as light-emitting thin flat display elements are plasma displays, FEDs (field emission displays), and others. Liquid-crystal light-modulating elements are being advantageously used in liquid-crystal displays, which are thin flat display elements.

A typical example of liquid-crystal displays has a structure formed by charging a nematic liquid crystal into the space between a pair of substrates having an electroconductive transparent film formed thereon so that the liquid crystal is oriented in parallel with each substrate and is twisted by 90° between both substrates, sealing the resultant package, and sandwiching this package with transverse polarizers. In this liquid-crystal display, when a voltage is applied between the electroconductive transparent films, the major axis of each liquid-crystal molecule is oriented so as to be perpendicular to the substrates and the transmittance of the light emitted by the backlight changes. Thus, an image is produced based on this change in transmittance. For imparting satisfactory suitability for dynamic images, an active-matrix liquid-crystal panel employing a TFT (thin-film transistor) is used.

A plasma display has a structure comprising two glass plates between which a rare gas such as neon, helium, or xenon has been enclosed and many perpendicular electrodes regularly arranged between the two glass plates and corresponding to discharge electrodes. In this structure, the intersection of each pair of opposing electrodes serves as a pixel unit.

In this plasma display, a voltage is applied selectively to the opposing electrodes corresponding to given intersections according to image information to thereby cause the intersections to discharge electricity and emit light. The resultant ultraviolet causes a phosphor to show excitation luminescence and thereby produce an image.

An FED has a flat display tube structure comprising a pair of panels which have been disposed face to face at a minute distance and the periphery of which has been sealed. The viewing-side panel has a fluorescent film disposed on the inner surface thereof, while the back-side panel has field emission cathodes disposed for the respective unit luminescence regions. Typical field emission cathodes have field emission type microcathodes in a minute conically projecting shape called emitter tips.

In this FED, electrons are taken out with emitter tips and are accelerated and caused to strike on a phosphor to thereby excite the phosphor. Thus, an image is produced.

However, the existing flat display elements described above have the following problems. First, the liquid-crystal display has a problem that since the light emitted by the backlight is caused to pass through many layers comprising the polarizers, transparent electrodes, and color filter, the efficiency of light utilization is low. Other problems thereof include those characteristic of liquid crystals, i.e., deterioration in image quality due to viewing angle dependence and deterioration in dynamic-image quality due to a low response rate, and a cost problem in large displays employing a TFT. The plasma display has drawbacks that since partition walls for discharge should be formed for each pixel, it is difficult to obtain high brightness at a high efficiency when the resolution is high, and that the display is costly because it necessitates a high operating voltage. Furthermore, the FED has a drawback that the production cost is high as in the plasma display because the inside of the panels should be evacuated to an ultrahigh vacuum so as to enable a discharge to occur stably at a high efficiency. The FED has further had a disadvantage that a high voltage is necessary for accelerating electrons resulting from field emission and causing these to strike on the phosphor.

A flat display element in which the position of a flexible thin film is changed by an electromechanical motion and the light emitted by a light source is modulated based on this position change to produce an image has recently been developed as a display which eliminates those various problems. There are various modes of producing an electromechanical motion, such as one utilizing a piezoelectric effect of voltage application and one utilizing an electromagnetic force caused by current application. However, the mode utilizing an electrostatic force, in particular, enables a short operating time of several microseconds or shorter at a low voltage with reduced power consumption as long as the positional change required of the flexible thin film for light modulation is up to about 1 μm. Furthermore, since the positional change with voltage shows hysteresis, passive-matrix operation with high contrast is possible in a two-dimensional array constitution and an active element such as a TFT is unnecessary. Consequently, a large flat display element can be produced at low cost. Examples of this kind of flat display element include those of the lightguide plate type described in the following documents.

*Large-Area Micromechanical Display IDRC* 1997, p230–p233

U.S. Pat. No. 5,771,321

JP-T-2000-505911 (The term "JP-T" as used herein means a published Japanese translation of a PCT patent application.)

FIG. 29 is a sectional view of part of a flat display element 80 of the lightguide plate type. This display element comprises a lightguide plate (or waveguide) 82 and a prism 84 optically connected to an edge of one side of the lightguide plate 82. As shown in the figure, light is introduced from a light source (e.g., a white light source, LED, or laser) 86 through this prism 84, and the light is led by means of total reflection within the lightguide plate 82. This display element has flexible thin films 88 disposed over a surface of the lightguide plate 82 so as to be capable of separating from/contacting with the surface of the lightguide plate 82.

These flexible thin films 88 and the lightguide plate 82 each have an electrode layer 89 formed on a surface thereof. When a driving voltage is applied to the electrode layer 89 of a flexible thin film 88, this thin film 88 comes into contact with the surface of the lightguide plate 82, upon which a condition of total reflection on the surface of the lightguide plate 82 is disturbed and light is taken out of the lightguide plate 82. On the other hand, the flexible thin films 88 to which no driving voltage is applied remain apart from the surface of the lightguide plate 82 and no light is released therethrough.

By thus selectively applying a driving voltage to the electrode layers 89 of the flexible thin films 88, a display image is produced on the surface of the lightguide plate 82.

Other examples of flat display elements include that described in the following document.

Waveguide Panel Display Using Electromechanical Spatial Modulators, 1998 *SID International Symposium Digest of Technical Papers*, p.1022–p.1025.

The flat display element described in the document shown above has a constitution which comprises, as shown in FIG. 30, a front-side glass 91, parallel lightguides 92 arranged over the glass 91, and an LED (light-emitting diode) array 95 connected to an edge of the lightguides 92 through a light-transmitting material 94 having a microlens 93. The LED array 95 comprises light-emitting parts arranged one-dimensionally, and the individual light-emitting parts correspond to the respective lightguides 92. Flexible thin films (light switches) 96 spaced in parallel have been disposed over the lightguides 92 in a direction perpendicular to the lightguides 92. A back-side glass 97 has been disposed over the flexible thin films 96 so as to be only partly in contact with the flexible thin films 96. The back-side glass 97 supports these flexible thin films 96 in a manner capable of changing the positions thereof.

In this flat display element 90, which has such constitution, when a voltage is applied to the electrode on a given flexible thin film 96, the flexible thin film 96 shifts its position toward the lightguides 92 by means of an electrostatic stress as shown in FIG. 31. On the other hand, the LED array 95 emits light synchronously with the positional shifting according to image signals. As a result, the light which has proceeded through the lightguides 92 through total reflection is introduced into the flexible thin film 96, reflected by a mirror 98 disposed in the flexible thin film 96, and then injected again into the lightguides 92 in a direction nearly perpendicular thereto. The light injected into the lightguides 92 in a direction nearly perpendicular thereto cannot retain an incidence angle satisfying a condition of total reflection and, hence, passes through the lightguides 92 and is released from the front-side glass 91.

According to this flat display element 90, the flexible thin films 96 can be operated at a high response rate because the positions of the flexible thin films are changed by means of an electrostatic stress. In addition, light does not pass through many layers unlike that in liquid-crystal displays, and this display element necessitates neither the formation of partition walls in discharge parts nor a high-voltage driving circuit unlike plasma displays. Consequently, a high-speed, inexpensive, flat display element can be realized.

However, in the flat display elements 80 and 90 of the photowaveguide type described above, incident light is introduced by a method in which incident light is introduced through a prism connected to an edge of one side of the lightguide plate or through an edge of a lightguide plate/waveguide. However, the lightguide plate/waveguide of a thin flat shape has a small edge area available for incidence and tends to have an impaired efficiency of coupling with incident light.

Moreover, since a further thickness reduction and a larger area are desired in lightguide plates and waveguides, the edge area available for incidence tends to decrease more and more and there is a fear of an impaired efficiency of coupling. Furthermore, there are limitations on the shape of incident light (light source) and on position for introduction. Namely, the size and number of light sources are limited and high-output light cannot be introduced. In addition, the incident light should have a beam/linear shape and this poses limitations on the kind of light sources or separately necessitates an optical system for forming such shape. As a result, there is a problem that the production process is complicated to increase the cost.

In the flat display element 80, when an element located upstream in the light path from the lightguide is brought into an ON state for image production, the light introduced into areas located downstream in the light path from this element attenuates to cause the so-called crosstalk and thereby impair image quality. Furthermore, there also is a problem that leakage light released from an ON-state element reduces the contrast of images around the element. On the other hand, in the flat display element 90, since high-output light is injected into the thin lightguide, a loss of light coupling occurs in the lightguide, resulting in a reduced efficiency of light utilization. Furthermore, in case where the waveguide has even a slight defect in part thereof, leakage light is released from this part. Thus, the display element 90 has a constitution which is apt to suffer a decrease in image quality.

An object of the invention, which has been achieved in view of the existing problems described above, is to provide a light-modulating element which eliminates the necessity of use of a display technique employing a waveguide or lightguide plate, enables use of any desired backlight, and has an elevated energy efficiency while preventing a decrease in contrast at low cost. Another object is to provide a display element capable of producing high-quality display images. Still another object is to provide an exposure element capable of exposure treatment.

DISCLOSURE OF THE INVENTION

For accomplishing those objects,
(1) the light-modulating element according to the invention is a light-modulating element having a flat shape, characterized by comprising: a total-reflection optical member having such a property that at least part of incident light introduced into the light-modulating element is totally reflected at an interface of a layer constituted by the light-modulating element and the incident light does not substantially go out through the side opposite to the incident-light introduction side; and light-coupling elements which are disposed on the total reflection plane side of the total-reflection optical member and serve to selectively couple with the incident light and take out the same from the total reflection plane.

In this light-modulating element, the incident light introduced is caused to strike on the total-reflection optical member. After the incident light is introduced into the total-reflection optical member, at least part of the incident light introduced is totally reflected at an interface of a layer constituted by the light-modulating element, while the incident light does not substantially go out through the side opposite to the incident-light introduction side. Light-coupling elements serving to couple with incident light and take out the same are selectively disposed close to the total reflection plane of this total-reflection optical member, whereby the light to be totally reflected is taken out by the light-coupling elements disposed close and is emitted toward the incident light light-path front side. Consequently, planar incident light can be introduced into the light-modulating element at a high efficiency and light modulation can be selectively conducted according to the state of the close disposition of light-coupling elements.

(2) The light-modulating element may be characterized in that the incident light is planar light.

In this light-modulating element, since the light to be introduced into the light-modulating element is planar light, the loss in a light path is reduced and the planar incident light can be introduced into the light-modulating element at a high efficiency while retaining the planar state. A constitution having an elevated energy efficiency can hence be attained.

(3) The light-modulating element may be characterized in that the light-coupling elements take out the incident light by changing a condition of incident-light total reflection on the total reflection plane.

In this light-modulating element, when light-coupling elements are disposed close to the total reflection plane of the total-reflection optical member, then a condition of total reflection on the total reflection plane changes and, as a result, the incident light introduced into the total-reflection optical member is coupled with the light-coupling elements and taken out.

(4) The light-modulating element may be characterized in that the light-coupling elements comprise a flexible thin film supported so as to be capable of being brought near to the total reflection plane of the total-reflection optical member by an electromechanical motion.

This light-modulating element has a constitution in which light-coupling elements are brought near to the total reflection plane of the total-reflection optical member by any of various methods such as a method utilizing an electrostatic force caused by voltage application, a method utilizing a piezoelectric effect of voltage application, and a method utilizing an electromagnetic force caused by current application. Thus, a power-saving light switch having excellent response characteristics can be realized.

(5) The light-modulating element may be characterized in that the electromechanical motion is a motion caused by an electrostatic force.

This light-modulating element has a constitution in which light-coupling elements are operated by an electrostatic force to thereby bring the flexible thin film near to the total reflection plane of the total-reflection optical member to a distance of several micrometers or shorter. Thus, high-speed operation is possible at a low voltage with reduced power consumption.

(6) The light-modulating element may be characterized in that the light-coupling elements comprise a layer containing a liquid crystal which changes in optical property upon application of an electric field thereto.

In this light-modulating element, light-coupling elements change a condition of total reflection based on a change of the liquid crystal in optical property caused by application of an electric field thereto. Thus, light switching can be obtained with an inexpensive constitution.

(7) The light-modulating element may be characterized in that the light-coupling elements have been arranged in one-dimensional array over the total-reflection optical member.

Since this light-modulating element has a constitution including light-coupling elements arranged in one-dimensional array over the total-reflection optical member, it can be a light-modulating element capable of one-dimensional simultaneous modulation.

(8) The light-modulating element may be characterized in that the light-coupling elements have been arranged in two-dimensional array over the total-reflection optical member.

Since this light-modulating element has a constitution including light-coupling elements arranged in two-dimensional array over the total-reflection optical member, it can be a light-modulating element capable of two-dimensional simultaneous modulation and capable of producing an image.

(9) The light-modulating element may be characterized in that the light-coupling elements have been connected to a passive-matrix operating means.

In this light-modulating element, the light-coupling elements especially are ones operated by an electrostatic force. For example, when a voltage is applied between an electrode disposed on the total reflection plane side of the total-reflection optical member and an electrode disposed on a partly supported flexible thin film, then the flexible thin film shifts its position toward the total reflection plane of the total-reflection optical member. By suitably selecting the shape and mechanical properties, e.g., elastic constant, of this flexible thin film, gap distance between the flexible thin film and the total reflection plane, etc., the property of changing the position with applied voltage is made to show hysteresis. This hysteresis can be utilized, for example, in the following manner. Two or more stripe electrodes are disposed on the total reflection plane side of the total-reflection optical member to constitute signal electrodes, while two or more stripe electrodes perpendicular to those are arranged on the flexible thin film to constitute scanning electrodes. A potential is suitably applied to these signal electrodes and scanning electrodes. Thus, transmittance for any desired one or more of the pixels arranged two-dimensionally can be controlled with a high contrast without using an active element such as a TFT. Namely, a passive-matrix operation is possible, whereby an inexpensive light-modulating element having a large are can be realized.

(10) The light-modulating element may be characterized in that the light-coupling elements have a light path deflector which changes the path of the light taken out.

In this light-modulating element, the path of the light taken out by a light-coupling element is changed. Hence, outgoing light from the optical element can be converged in a specific direction or diffused.

(11) The light-modulating element may be characterized in that the light path deflector changes, based on refraction, the path of the light taken out.

In this light-modulating element, the path of the light taken out through a light-coupling element is changed by refraction, whereby a light path change can be made while maintaining the quantity of light.

(12) The light-modulating element may be characterized in that the light path deflector comprises any of a lens array, a prism array, and a graded-index lens body.

For this light-modulating element, an optical element suitable for mass production is suitably selected from ones comprising a lens array, a prism array, and a graded-index lens body. Thus, satisfactory performance can be exhibited while attaining a cost reduction.

(13) The light-modulating element may be characterized in that the light path deflector changes, based on diffraction, the path of the light taken out.

In this light-modulating element, the path of the light taken out through a light-coupling element is changed by diffraction, whereby the light path can be regulated with high precision.

(14) The light-modulating element may be characterized in that the light path deflector comprises any of a volume hologram, a phase-modulating diffraction grating, and an amplitude-modulating diffraction grating.

This light-modulating element can be mass-produced through transfer, for example, by the photopolymer method or injection molding method. Consequently, the cost of the optical element itself can be reduced.

(15) The light-modulating element may be characterized in that the light path deflector changes, based on light diffusion or light scattering, the path of the light taken out.

In this light-modulating element, since a light path is changed by light diffusion or light scattering, the light taken out can be emitted in any desired direction.

(16) The light-modulating element may be characterized in that the light path deflector is any of a porous object, an object containing a substance with a different refractive index dispersed or distributed therein, and a light-diffusing or light-scattering object having irregularities on a surface thereof.

A porous object, an object containing a substance with a different refractive index dispersed or distributed therein, or a light-diffusing or light-scattering object, which are suitable for mass production, is suitably selected for this light-modulating element. Consequently, the cost of the optical element itself can be reduced.

(17) The light-modulating element may be characterized in that the light-coupling elements have a specific-wavelength-component-absorbing means which absorbs and emits a specific-wavelength component of the light taken out.

In this light-modulating element, a component having a specific wavelength, among the wavelength components of the light taken out, is absorbed before the light is emitted. Consequently, even when incident light of the same kind is introduced, outgoing lights of different colors can be selectively obtained.

(18) The light-modulating element may be characterized in that the light-coupling elements each have a phosphor which shows excitation luminescence upon reception of the light taken out.

Since this light-modulating element has phosphors which show excitation luminescence by the action of the light taken out, outgoing lights having two or more colors can be obtained according to the luminescence of the phosphors.

(19) The light-modulating element may be characterized by having phosphors which show excitation luminescence upon reception of the outgoing light taken out by the light-coupling elements.

In this light-modulating element, phosphors are disposed, for example, on the light-path front side of the light-coupling elements, whereby the outgoing light taken out through light-coupling elements can be converted to light having any desired wavelength.

(20) The light-modulating element may be characterized in that the total-reflection optical member has, disposed therein, an optical element which changes a light path, and that at least part of the planar incident light introduced into the total-reflection optical member is introduced into the optical element changing a light path and substantially all the incident light thus introduced is reflected by total reflection at an interface of a layer constituted by the total-reflection optical member.

In this light-modulating element, an optical element which changes the light path of incident light has been disposed and planar incident light is introduced into this light path-changing optical element. The light path of the planar incident light introduced is changed to a specific direction or any desired direction by the light path-changing optical element, and substantially all the light is reflected by total reflection at an interface of a layer constituted by the light-modulating element. Because of this, there are no limitations on the shape of incident light, position for introduction, and kind of light source, and planar incident light can be directly introduced at a high efficiency while retaining the planar state. Totally reflected planar light can hence be obtained at a desired interface at a high efficiency.

Furthermore, a reflector having no incidence angle dependence and showing no absorption can be constituted. Since substantially no transmitted light is released from the light-modulating element, the efficiency of light utilization can be heightened.

(21) The light-modulating element may be characterized in that the total-reflection optical member has, disposed therein, an optical element which selects a light path, and that at least part of the planar incident light introduced into the total-reflection optical member is introduced into the optical element selecting a light path and substantially all the incident light thus introduced is reflected by total reflection at an interface of a layer constituted by the total-reflection optical member.

In this light-modulating element, an optical element which selects the light path of incident light has been disposed and planar incident light is introduced into this light path-selecting optical element. The light path of the planar incident light introduced is changed to a specific direction or any desired direction by the light path-selecting optical element, and substantially all the light is reflected by total reflection at an interface of a layer constituted by the light-modulating element. Because of this, there are no limitations on the shape of incident light, position for introduction, and kind of light source, and planar incident light can be directly introduced at a high efficiency while retaining the planar state. Totally reflected planar light can hence be obtained at a desired interface at a high efficiency.

Furthermore, a reflector having no incidence angle dependence and showing no absorption can be constituted. Since substantially no transmitted light is released from the light-modulating element, the efficiency of light utilization can be heightened.

(22) The light-modulating element may be characterized in that the total-reflection optical member has an optical element changing a light path and an optical element selecting a light path which are disposed in this order from the incident-light introduction side in the direction of the thickness of the total-reflection optical member, and that when planar incident light is introduced into the optical element changing a light path, then at least part of the incident light introduced is introduced into the optical element selecting a light path and substantially all the incident light thus introduced is reflected by total reflection at an interface of a layer constituted by the light-modulating element.

In this light-modulating element, an optical element which changes a light path and an optical element which selects a light path have been disposed in this order from the incident-light introduction side in the direction of the thickness of the light-modulating element, and planar incident light is introduced into the light path-changing optical element.

The light path of the incident light introduced is changed to a specific direction or any desired direction by the light path-changing optical element, and only the incident light proceeding in a specific direction is transmitted by the light path-selecting optical element. Thus, substantially all the light introduced into the light-modulating element is reflected by total reflection at an interface of a layer constituted by the light-modulating element. Because of this, there are no limitations on the shape of incident light, position for introduction, and kind of light source, and planar incident light can be directly introduced at a high efficiency while retaining the planar state. Totally reflected planar light can hence be obtained at a desired interface at a high efficiency.

Furthermore, a reflector having no incidence angle dependence and showing no absorption can be constituted. Since substantially no transmitted light is released from the light-modulating element, the efficiency of light utilization can be heightened.

(23) The light-modulating element may be characterized in that the optical element changing a light path and the optical element selecting a light path are in optical contact with each other.

In this light-modulating element, since the light path-changing optical element is in optical contact with the light path-selecting optical element, satisfactory suitability for coupling with light can be imparted to these two elements. In addition, when the light path-changing optical element has directional properties, incident light can be introduced from the light path-changing optical element to the light path-selecting optical element while keeping the incident light retaining an incidence angel component thereof.

(24) The light-modulating element may be characterized in that the optical element changing a light path and the optical element selecting a light path are in optical contact with each other through a medium having a refractive index higher than 1.

In this light-modulating element, since the light path-changing optical element is in optical contact with the light path-selecting optical elemental through a medium having a refractive index higher than 1, incident light can be introduced from the light path-changing optical element to the light path-selecting optical element without causing total reflection at the interface between each element and this medium.

(25) The light-modulating element may be characterized in that the light-modulating element has a transparent medium constituting part of the total-reflection optical member and the optical element changing a light path has been disposed on the light-path front side of the transparent medium.

In this light-modulating element, incident light passes through the transparent medium and is then introduced into the light path-changing optical element. Hence, only the incident light proceeding in a specific direction is transmitted.

(26) The light-modulating element may be characterized in that the light-modulating element has a transparent medium constituting part of the total-reflection optical member and the optical element selecting a light path has been disposed on the light-path front side of the transparent medium.

In this light-modulating element, incident light passes through the transparent medium and is then introduced into the light path-selecting optical element. Hence, only the incident light proceeding in a specific direction is transmitted.

(27) The light-modulating element may be characterized in that the light-modulating element has a transparent medium constituting part of the total-reflection optical member, and the optical element changing a light path and the optical element selecting a light path have been disposed in this order on the light-path front side of the transparent medium.

In this light-modulating element, incident light passes through the transparent medium and is then introduced into the light path-changing optical element. The light path of the incident light is thus changed to a specific direction or any desired direction. This incident light is further introduced into the light path-selecting optical element, whereby only the incident light proceeding in a specific direction is transmitted.

(28) The light-modulating element may be characterized in that the optical element changing a light path forward outputs light comprising at least light components having an angle $\theta t$ satisfying the requirement $\sin \theta t > nw/nt$, wherein nt is the average refractive index of the optical element changing a light path, nw is the refractive index of the medium disposed on the light-path front side of the total reflection plane, and $\theta t$ is the angle of the light passing through the medium of the optical element changing a light path.

In this light-modulating element, at least light having an angle $\theta t$ satisfying the requirement $\sin \theta t > nw/nt$ passes through the light path-changing optical element and is outputted forward while changing its light path.

(29) The light-modulating element may be characterized in that the optical element changing a light path is one which changes a light path based on refraction.

In this light-modulating element, since the light path-changing optical element changes the light path of incident light based on refraction, the incident light can be introduced into the light-modulating element without substantially lowering the intensity of the incident light.

(30) The light-modulating element may be characterized in that the optical element changing a light path is any of a lens array, a prism array, and a different-refractive-index distribution object in which different refractive indexes are distributed.

For this light-modulating element, an optical element suitable for mass production is suitably selected from ones comprising a lens array, a prism array, and a different-refractive-index distribution object. Thus, satisfactory performance can be exhibited while attaining a cost reduction.

(31) The light-modulating element may be characterized in that the optical element changing a light path is one which changes a light path based on diffraction.

In this light-modulating element, the light path-changing optical element changes the light path of incident light based on diffraction, e.g., the diffraction caused by a transmission type diffraction grating. Thus, incident light can be introduced into the light-modulating element at a highly precise angle of incidence.

(32) The light-modulating element may be characterized in that the optical element changing a light path is any of a volume hologram, a phase-modulating diffraction grating, and an amplitude-modulating diffraction grating.

This light-modulating element can be mass-produced through transfer, for example, by the photopolymer method or injection molding method. Consequently, the cost of the optical element itself can be reduced.

(33) The light-modulating element may be characterized in that the optical element changing a light path is one which changes a light path based on light diffusion.

In this light-modulating element, since the light path-changing optical element changes a light path based on light diffusion, incident light can be injected into the light-modulating element from any desired direction.

(34) The light-modulating element may be characterized in that the optical element changing a light path is any of a porous object, an object containing a substance with a different refractive index distributed or dispersed therein, and a diffusing or scattering object having irregularities on a surface thereof.

For this light-modulating element, an optical element suitable for mass production is suitably selected from ones comprising a porous object, an object containing a substance with a different refractive index distributed or dispersed therein, and a diffusing object. Thus, satisfactory performance can be exhibited while attaining a cost reduction.

(35) The light-modulating element may be characterized in that the optical element changing a light path is one which changes a light path based on light reflection.

In this light-modulating element, since the light path-changing element changes a light path based on light reflection, incident light can be injected into the light-modulating element from any desired direction.

(36) The light-modulating element may be characterized in that the optical element selecting a light path has such a property that substantially all the transmitted light emitted by the optical element has components having an angle larger than the critical total reflection angle at an interface of a layer disposed on the incident light light-path front side of the optical element selecting a light path or at the interface of the incident light light-path front side of the optical element selecting a light path and the incident light components having any other angle are selectively reflected and are not transmitted therethrough.

In this light-modulating element, the light path-selecting optical element has such a property that substantially all the transmitted light emitted by this optical element has components having an angle larger than the critical total reflection angle at an interface of a layer disposed on the incident light light-path front side of the light path-selecting optical element or at the interface of the incident light light-path front side of the light path-selecting optical element and the components having any other angle are selectively reflected by the light path-selecting optical element. Consequently, only those components of incident light which have such an angle of incidence as to undergo total reflection at an interface on the incident light light-path front side are selectively transmitted by the light path-selecting optical element, while the components having such an angle of incidence as not to undergo total reflection are not transmitted.

(37) The light-modulating element may be characterized in that the optical element selecting a light path transmits substantially all light having an angle θs satisfying the requirement sin θs>nw/ns, wherein ns is the average refractive index of the optical element selecting a light path, nw is the refractive index of the medium disposed on the light-path front side of the total reflection plane, and θs is the angle of the light passing through the medium of the optical element selecting a light path.

In this light-modulating element, substantially all light having an angle θs satisfying the requirement sin θs>nw/ns passes through the light path-selecting optical element, while the other light is reflected. Thus, specific light components only are selectively transmitted.

(38) The light-modulating element may be characterized in that the optical element selecting a light path functions to reflect incident light selectively with respect to wavelength region, and that as the incidence angle of the light striking on the optical element selecting a light path with the plane of the optical element becomes smaller, the wavelength of the incident light selectively reflected shifts to the shorter-wavelength side.

In this light-modulating element, the light path-selecting optical element functions to reflect incident light selectively with respect to wavelength region, and as the incidence angle of the light striking on this optical element with the plane of the optical element becomes smaller, the wavelength of the incident light selectively reflected shifts to the shorter-wavelength side. This property can be utilized to design a light path-selecting optical element so as to transmit only an incident light component having a given angle of incidence. Thus, only the incident light components having such an angle of incidence as to undergo total reflection can be selectively extracted.

(39) The light-modulating element may be characterized in that when the incidence angel of the light striking on the optical element selecting a light path is regulated so that the angle of incidence on the total reflection plane on the incident light light-path front side is not larger than the critical total reflection angle, then the optical element selecting a light path selectively reflects substantially all the incident light.

In this light-modulating element, the light path-selecting optical element selectively reflects substantially all incident light, when the incidence angle of the incident light striking on the light path-selecting optical element is regulated so that the angle of incidence on the total reflection plane on the incident light light-path front side is not larger than the critical total reflection angle at this total reflection plane, although that angle of incidence on this total reflection plane varies depending on the angle of incidence on this optical element and refraction conditions in each layer. Thus, those components of incident light which have such an angle as not to undergo total reflection at the total reflection plane are selectively reflected and prevented from being transmitted toward the light-path front side.

(40) The light-modulating element may be characterized in that the optical element selecting a light path is an optical interference filter comprising a dielectric multilayer film.

In this light-modulating element, since an optical interference filter comprising a dielectric multilayer film is employed, any desired wavelength-selective reflection film having a large area and a simple constitution can be formed. By utilizing the incidence angle dependence of the wavelength of the reflected light, the light path-selecting optical element can be easily formed.

(41) The light-modulating element may be characterized in that the optical element selecting a light path is a Bragg reflection filter comprising either a cholesteric liquid crystal or a volume hologram.

In this light-modulating element, since a Bragg reflection filter comprising either a cholesteric liquid crystal or a volume hologram is employed, the light path-selecting optical element can be formed at low cost.

(42) The light-modulating element may be characterized in that the total-reflection optical member has an optical element which introduces incident light into the light-modulating element and that when planar incident light is introduced into the incident-light-introducing optical element, then substantially all the incident light introduced is reflected by total reflection at an interface of a layer constituted by the light-modulating element.

In this light-modulating element, when planar incident light is introduced into the incident-light-introducing optical element, the incident light totally reflected at an interface of a layer constituted by the light-modulating element is introduced into the total-reflection optical member. Substantially all the incident light introduced is reflected by total reflection at the interface of the layer constituted by the light-modulating element. Thus, planar incident light can be directly introduced at a high efficiency while retaining the planar state with a simple constitution, without introducing incident light through an edge of the light-modulating element at an angle larger than the critical total reflection angle. A higher output can hence be attained. Furthermore, since substantially all the incident light introduced is reflected by total reflection without causing a reflection loss, the light-modulating element can function as a high-efficiency reflector.

(43) The light-modulating element may be characterized in that the optical element introducing incident light is an array of prisms disposed in planar arrangement.

In this light-modulating element, planar incident light sent from a given direction is converted by the prism array so that the light is introduced at such an angle as to undergo total reflection in the light-modulating element. Thus, incident light capable of being totally reflected can be introduced into the light-modulating element.

(44) The light-modulating element may be characterized in that substantially all the incident light which has been totally reflected returns to the incident-light introduction side of the total-reflection optical member.

In this light-modulating element, since substantially all the incident light which has been totally reflected returns to the incident-light introduction side of the light-modulating element, substantially none of light transmission, accumulation, confinement, and the like occurs within the medium having a total reflection plane.

(45) The light-modulating element may be characterized in that the layer constituting the total-reflection optical member shows substantially no absorption in the wavelength region for the incident light.

In this light-modulating element, since the layer constituting the total-reflection optical member shows substantially no absorption in the wavelength region for the incident light, the incident light and the totally reflected incident light can be inhibited from suffering a loss and a higher efficiency can hence be attained.

(46) The display element is characterized by comprising the light-modulating element of any one of claims 1 to 45 and a flat light source for introducing incident light into the light-modulating element.

In this display element, incident light from a flat light source is introduced into the light-modulating element of any one of claims 1 to 45, whereby the light introduced into the total-reflection optical member can be modulated by the light-coupling elements and selectively emitted to the light-path front side.

(47) The display element may be characterized in that the incident light is collimated light having a specific incidence angle range.

In this display element, since the incident light is collimated light having a specific incidence angle range, an incident light component having a specific incidence angle can be supplied to the light-modulating element. Thus, the efficiency of light utilization can be improved.

(48) The display element may be characterized in that the incident light is collimated light having two or more incidence angles.

In this display element, since the incident light is collimated light having two or more incidence angles, two or more incident light components having different incidence angles can be supplied to the light-modulating element at a time.

(49) The display element may be characterized in that the incident light is diffused light having arbitrary incidence angles.

In this flat element, since the incident light is diffused light having arbitrary incidence angles, the incident light can be introduced from various directions into the light-modulating element. Thus, evenness of incident light can be improved.

(50) The display element may be characterized by having a phosphor on the light-coupling elements or on the light-path front side thereof and further having, interposed between the total reflection plane of the total-reflection optical member and the light-coupling elements, an optical filter which reflects wavelength components of the luminescence of the phosphor and transmits wavelength components of the incident light.

In this display element, incident light passes through the optical filter and then strikes on the phosphor, upon which the phosphor luminesces. Of the luminescence thus emitted by the phosphor, the light emitted to the light-path back side is reflected by the optical filter and directed toward the light-path front side. Thus, the efficiency of light utilization is improved and higher display brightness is possible.

(51) The display element may be characterized by having the phosphor on the light-coupling elements or on the light-path front side thereof and further having, disposed on the light-path front side of the phosphor, an optical filter which transmits wavelength components of the luminescence of the phosphor and shuts off wavelength components of the incident light.

In this display element, when UV light, for example, is used as the incident light, the transmitted light (leakage light) thereof can be prevented from being released toward the viewing side (viewer side).

(52) The display element may be characterized by having the phosphor on the light-coupling elements or on the light-path front side thereof and further having, on the light-path front side of the phosphor, an optical filter which absorbs light in the luminescence wavelength region.

In this display element, an ND filter which absorbs visible light (transmittance, about from 20 to 70%) may be disposed on the viewing side (viewer side) when the luminescence of the phosphor, for example, has wavelengths within the visible light region. Thus, an image with a high contrast can be produced even in a bright place.

(53) The display element may be characterized in that the optical filter is an optical interference filter comprising a dielectric multilayer film.

In this display element, since an optical interference filter comprising a dielectric multilayer film is employed, any desired wavelength-selective reflection film having a large area and a simple constitution can be formed. By utilizing the incidence angle dependence of the wavelength of the reflected light, the optical filter can be easily formed.

(54) The display element may be characterized in that the optical filter is a Bragg reflection filter comprising a cholesteric film.

In this display element, since a Bragg reflection filter comprising a cholesteric liquid crystal is employed, the optical film can be formed at low cost.

(55) The display element may be characterized in that the incident light has main wavelengths of from 350 nm to 400 nm.

In this display element, since the incident light has main wavelengths of from 350 nm to 400 nm, the phosphor can have an increased luminance and an image having higher brightness can be produced.

(56) The display element may be characterized in that the incident light has main wavelengths of from 400 nm to 500 nm.

In this display element, since the incident light has main wavelengths of from 400 nm to 500 nm, it is possible to constitute the display element using organic or other materials which do not have resistance to UV light.

(57) The display element may be characterized in that the phosphor emits visible light.

In this display element, since the phosphor emits visible light, a visible light image can be produced using a UV source.

(58) The display element may be characterized in that the phosphor comprises luminescent materials which emit red, green, and blue lights.

In this display element, the red, green, and blue phosphors disposed emit lights, whereby a full-color image can be produced.

(59) The display element may be characterized in that the flat light source is a light source disposed within the total-reflection optical member and the incident light is the light emitted by the light source.

In this display element, since a light source is disposed within the total-reflection optical member, the light emitted by the light source is directly introduced into the light-modulating element. Consequently, the loss in incident-light introduction is considerably reduced.

(60) The display element may be characterized in that the incident light is one introduced from outside the total-reflection optical member.

In this display element, since incident light is introduced from outside the total-reflection optical member, the degree of freedom of display element design is improved and even a large light source can be utilized. A higher output can be easily attained.

(61) The display element may be characterized by having a reflector which has been disposed so as to face the incident-light introduction side of the display element and by which the incident light which has been introduced into the display element and then reflected by the display element is directed again toward the display element.

In this display element, since a reflector has been disposed so as to face the incident-light introduction side of the display element, the incident light which has been injected into the display element and then reflected by the display element strikes on the reflector and the reflected light from this reflector is directed again toward the display element.

Consequently, light recycling occurs and the efficiency of light utilization is improved. Thus, a higher efficiency is attained.

(62) The exposure element is characterized by employing the display element of any one of claims 46 to 61 and selectively emitting light toward a work with light modulation based on exposure data.

In this exposure element, the display element of any one of claims 46 to 61 is employed and light modulation is conducted based on predetermined exposure data. Thus, light is directed selectively toward a work to be exposed, and the work to be exposed can be exposed.

BRIEF DESCRIPTION OF THE DRAWINGS

FIG. 16 is a sectional view illustrating part of an excitation luminescence type flat display element according to a fourth embodiment of the invention, which is an excitation luminescence type flat display element which includes phosphors disposed on a flexible thin film.

In the figures, numerals 2 and 3 denote a total-reflection optical member, 4 a flat light source, 5 a flat UV source, 6, 7, and 8 a light-coupling element, 10 a light path-changing optical element, 12 and 13 a light path-selecting optical element, 14 a transparent medium, 16 a transparent medium (e.g., air), 20 a substance with a different refractive index, 22, 52, 66, and 72 a total reflection plane, 26 a transparent electrode, 28 an alignment layer, 30 a cholesteric liquid-crystal layer, 32 a signal electrode, 34 a scanning electrode, 38 a light-diffusing layer, 40 a flexible thin film, 42a, 42b and 42c a phosphor, 44 a transparent substrate, 45 a front-side plate, 48 a black matrix, 50 a wavelength-selective reflecting film, 54 a liquid-crystal layer, 56 a PDLC layer, 60 a microcapsule, 64 a microprism array, 68 a prism, 70 a transparent medium, 100 a display element, 200 a flat display element, 300 and 400 an excitation luminescence type flat display element, $\theta_0$, $\theta_1$, $\theta_2$, and $\theta_3$ an incidence angle, $\theta_c$ a critical total-reflection angle, and $\lambda$ a wavelength.

BEST MODE FOR CARRYING OUT THE INVENTION

Preferred embodiments of the light-modulating element and display element according to the invention will be explained below in detail by reference to drawings.

The light-modulating element of the invention employs a total-reflection optical member which totally reflects at least part of introduced planar incident light at an interface of a layer constituted by the light-modulating element and which does not substantially release the incident light through the side opposite to the incident-light introduction side. In this light-modulating element, light-coupling elements serving to couple with incident light and take out the same are selectively disposed close to the total reflection plane of this total-reflection optical member. This light-modulating element is characterized in that planar incident light can be introduced into the light-modulating element at a high efficiency while retaining the planar state, that light modulation can be selectively conducted according to the state of the close disposition of light-coupling elements, and that light modulation with an elevated energy efficiency is possible without using a display technique employing a waveguide or lightguide plate.

Figure 1:
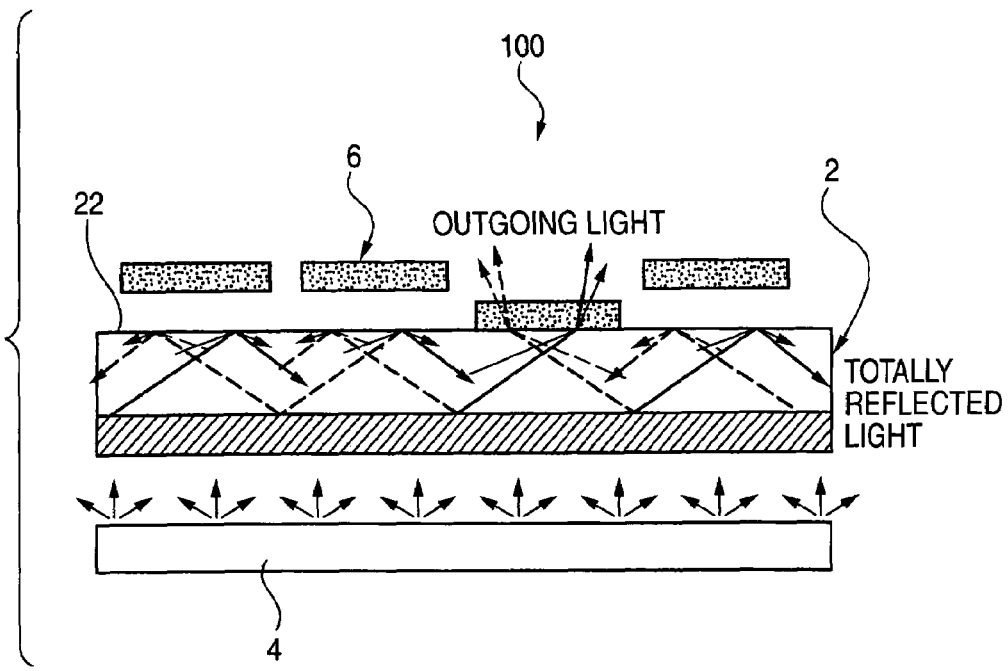
FIG. 1 is a view illustrating the diagrammatic constitution of a display element having a light-modulating element according to the invention mounted thereon.

FIG. 1 illustrates the conceptional constitution of a display element having a light-modulating element according to the invention. The display element 100 according to this embodiment comprises a flat total-reflection optical member 2, a flat light source 4 for introducing planar light into this total-reflection optical member 2, and light-coupling elements 6 comprising a flexible thin film and disposed so as to be capable of being brought near to the total-reflection optical member 2 on the side opposite to the incident-light introduction side. The total-reflection optical member 2 and the light-coupling elements constitute a light-modulating element. This total-reflection optical member 2 has such a constitution that when planar incident light is introduced, this incident light introduced is reflected by total reflection at the light-path front side (total reflection plane 22) of the total-reflection optical member 2. In that area in the total-reflection optical member 2 in which a light-coupling element 6 is disposed close thereto, a condition of total reflection on the total reflection plane 22 is disturbed and incident light is coupled with the light-coupling element 6, taken out, and emitted toward the light-path front side. On the other hand, in those areas in the total-reflection optical element 2 in which light-coupling elements 6 are not close to the total reflection plane 22, incident light is totally reflected and is substantially prevented from passing through this total-reflection optical member 2 and going out toward the light-path front side.

The light-coupling elements 6 are disposed so that they are movable to positions in contact with the total reflection plane 22 of the total-reflection optical member 2. However, the light-coupling elements need not be brought into complete contact with the total reflection plane 22 and bringing the elements sufficiently near to the plane 22 may suffice. In this case, by bringing the light-coupling elements near to the plane 22 at a distance of about $\lambda/10$ ($\lambda$ is wavelength) or shorter, the same proximity light coupling as in contacts can be caused.

Consequently, according to the display element 100 described above, when planar light is introduced from the flat light source 4 into the total-reflection optical member 2 and light-coupling elements 6 are selectively brought near to the total reflection plane 22 of the total-reflection optical member 2, then light is released toward the light-path front side through these light-coupling elements 6 brought near to the plane 22, whereby a desired image can be produced.

The constituent elements of the display element 100 will be explained below in detail.

First, the total-reflection optical member 2 is explained.

Figure 2:
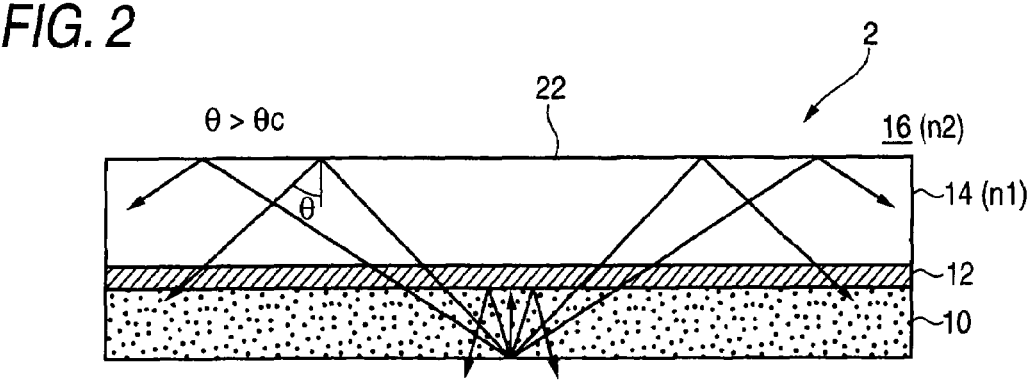
FIG. 2 is a view showing an example of the constitution of a total-reflection optical member.

FIG. 2 shows an example of the constitution of the total-reflection optical member 2. As shown in FIG. 2, the total-reflection optical member 2 is a multilayer structure composed of a light path-changing optical element 10, a light path-selecting optical element 12, and a transparent medium 14 which have been superposed in this order from the incident-light introduction side. A transparent medium 16 (air in this embodiment) is present on the light-path front side of the transparent medium 14 in this total-reflection optical member 2. The relationship between the refractive index n1 of the transparent medium 14 (first refractive index) and the refractive index n2 of the transparent medium 16 (second refractive index) has been regulated so as to satisfy a condition of total reflection at the total reflection plane 22, which is the interface between the transparent medium 14 and the transparent medium 16. For example, the refractive index n1 is 1.5 when the transparent medium 14 is a glass substrate, and the refractive index n2 is 1.0 when the transparent medium 16 is air. The layers constituting the total-reflection optical member 2 each show substantially no absorption in the wavelength region for the incident light. This optical member hence is a highly efficient optical member in which incident light and the incident light totally reflected at the total reflection plane 22 are inhibited from suffering a loss.

The light path-changing optical element 10 is an optical element which changes a light path based on refraction, diffraction, light diffusion, light reflection, etc. The following kinds of optical elements can, for example, be used.

Figure 3:
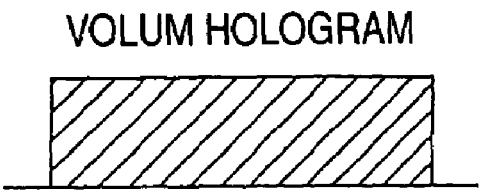
FIG. 3 is views illustrating transmission type diffraction gratings: (a) is a volume hologram; (b) is a relief type diffraction grating; and (c) is refractive-index-modulating diffraction grating.
Figure 3:
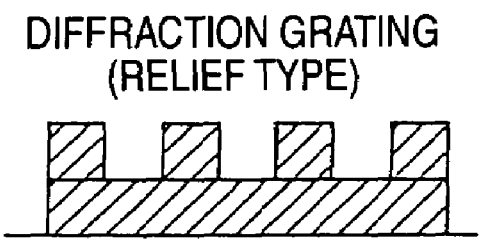
Figure 3:
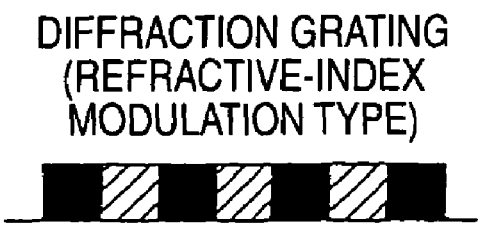

In the case of utilizing refraction, use may be made of a lens array, prism array, refractive-index dispersion object, and the like, in which the intensity of incident light does not substantially decrease. In the case of utilizing diffraction, transmission type diffraction gratings shown in FIG. 3 may be used. Phase-modulating diffraction gratings, amplitude-modulating diffraction gratings, and the like are used, such as a volume hologram (see FIG. 3(a)), relief type diffraction grating (see FIG. 3(b)), and refractive-index-modulating diffraction grating (see FIG. 3(c)). With these optical elements, the angle of the light path of incident light can be regulated with high precision. These optical elements each can be mass-produced through transfer, for example, by the photopolymer method or injection molding method.

Figure 4:
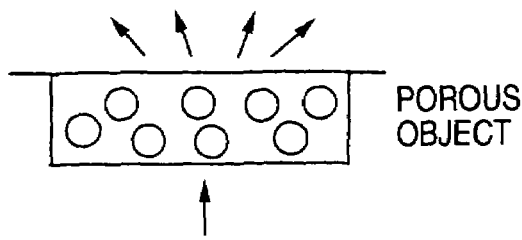
FIG. 4 is views illustrating light-diffusing plates: (a) is a porous object; (b) is a different-refractive-index distribution/dispersion object, i.e., an object containing a substance with a different refractive index distributed/dispersed therein; and (c) is a light-diffusing or light-scattering object having irregularities on a surface thereof.
Figure 4:
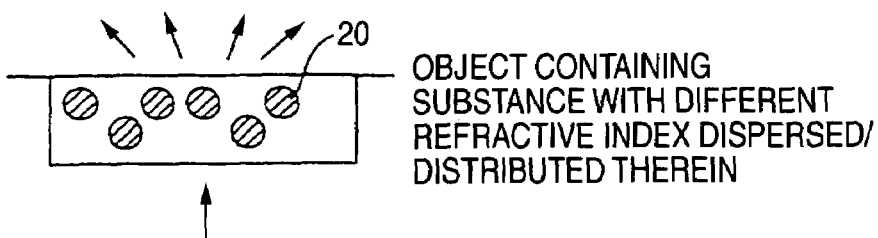
Figure 4:
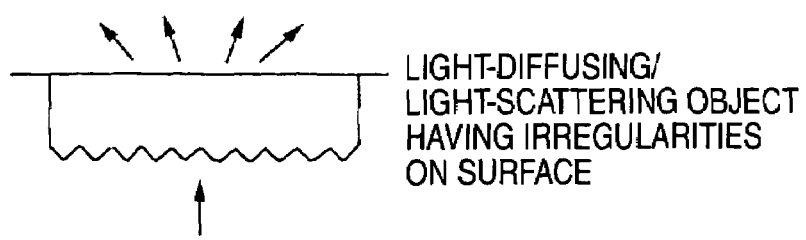

In the case of utilizing light diffusion, the light-diffusing plates shown in FIG. 4 may be used. Namely, a porous object (see FIG. 4(a)), different-refractive-index distribution/dispersion object in which a substance 20 having a different refractive index is distributed/dispersed (see FIG. 4(b)), light-diffusing or light-scattering object having irregularities on a surface thereof (see FIG. 4(c)), and the like may be used. Furthermore, in the case of utilizing light reflection, use may be made of, e.g., an object which contains minute reflectors dispersed therein and reflects light in arbitrary directions. These optical elements each are suitable for mass production and a cost reduction can be easily attained.

The light path-selecting optical element 12 is one which has such a property that substantially all the selectively transmitted light released from this optical element 12 has components having an angle larger than the critical total-reflection angle at a layer located on the incident light light-path front side and the incident light components having any other angle are selectively reflected and not transmitted therethrough. Namely, only the incident light components having an angle larger than the critical total-reflection angle $\theta_c$, which is a condition of total reflection at the interface between the transparent medium 14 and the transparent medium 16, pass through the light path-selecting optical element 12, while the incident light components having any other angle are shut off. The critical total-reflection angle $\theta_c$ is determined with the equation (1).

$$\theta_c = \sin^{-1}(n2/n1) \quad (1)$$

Figure 5:
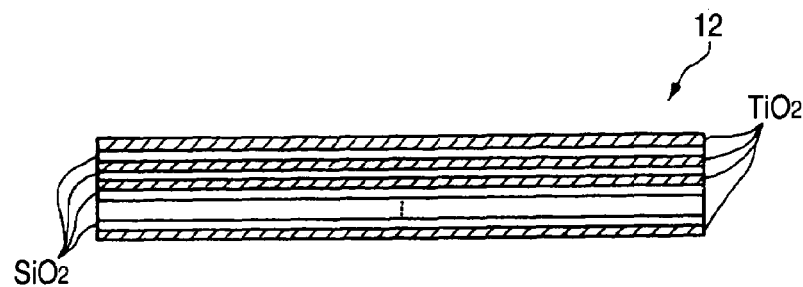
FIG. 5 is a view illustrating the layer constitution of an optical interference filter.

A specific example of the light path-selecting optical element 12 is an optical interference filter comprising a dielectric multilayer film. The layer constitution of this optical interference filter is shown in FIG. 5.

This optical interference filter is a dielectric multilayer film constituted by successively superposing a high-refractive-index material and a low-refractive-index material. Although optical properties thereof will be described later in detail, this optical interference filter functions to selectively reflect incident light according to its wavelengths and has such a property that the wavelength of the light selectively reflected thereby shifts to the shorter-wavelength side with the angle of incidence. Assuming that the wavelength region for incident light is from $\lambda_{iS}$ to $\lambda_{iL}$ ($\lambda_{iS} < \lambda_{iL}$), substantially all the incident light having a wavelength region of from $\lambda_{iS}$ to $\lambda_{iL}$ is selectively reflected with respect to those components of the selectively transmitted light released from the optical element 12 which have an outgoing angle not larger than the critical total-reflection angle $\theta_c$. According to this constitution, a reflecting film capable of any desired wavelength selection and having a large area and a simple constitution can be formed. By utilizing the incidence angle dependence of the wavelength of the reflected light, the light path-selecting optical element 12 can be easily formed. The optical interference filter described above may be a metal/dielectric multilayer film formed by adding a metal film to the layer constitution of a dielectric multilayer film. The optical interference filter comprising a dielectric multilayer film or the like can be formed by depositing thin film materials on a transparent substrate by EB vapor deposition (electron beam co-vapor deposition), sputtering, or the like. The thin film materials may be an organic multilayer film having different refractive indexes or an organic multilayer film containing an inorganic substance. In this case, coating, laminating, or the like can be used to form the thin film materials at low cost.

Optical properties of the light path-changing optical element 10 and light path-selecting optical element 12 are described here in detail.

Figure 6:
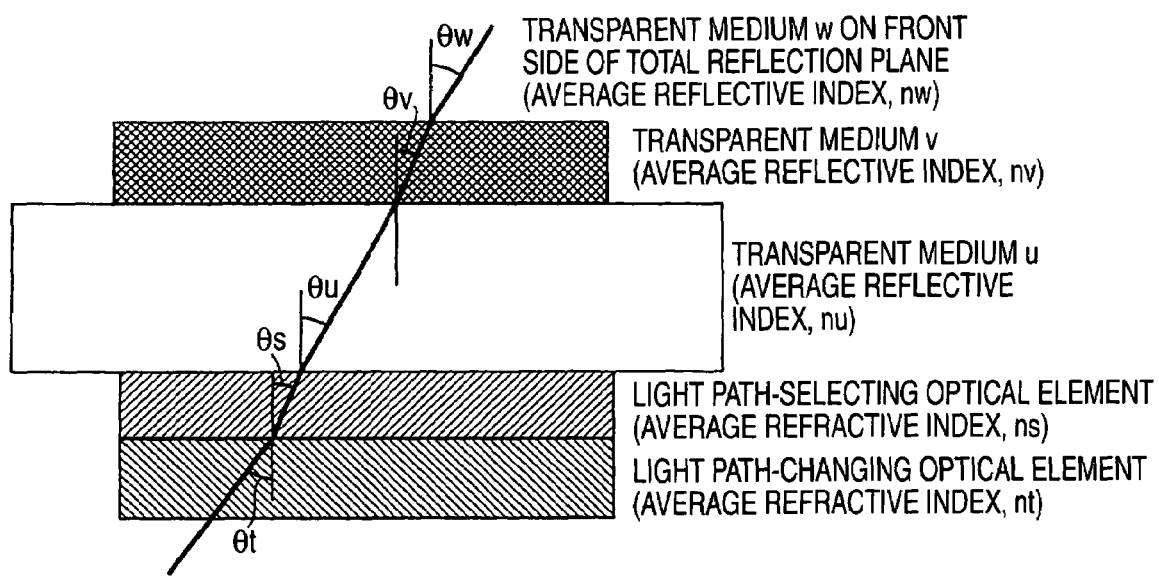
FIG. 6 is a view showing the relationship between the angle of incidence on each interface and the average refractive index of each medium in an optical element which comprises, disposed in this order, a light path-changing optical element, a light path-selecting optical element, a transparent medium u, a transparent medium v, and a transparent medium w on the front side of the total reflection plane.

First, the case in which the light path-changing optical element 10 is, for example, one changing a light path based on refraction is discussed. In the case of an optical element comprising, disposed in this order, a light path-changing optical element (average refractive index, nt), a light path-selecting optical element (average refractive index, ns), a transparent medium u (average refractive index, nu), a transparent medium v (average refractive index, nv), and a transparent medium w (average refractive index, nw) on the front side of the total reflection plane as shown in FIG. 6, the relationship between the angle of incidence on each interface and the average refractive index of each medium can be expressed by equations (2) provided that the interface between the transparent medium v and the transparent medium w is taken as the total reflection plane.

$$nv \cdot \sin \theta v = nw$$

$$nu \cdot \sin \theta u = nv \cdot \sin \theta v = nw$$

$$ns \cdot \sin \theta s = nu \cdot \sin \theta u = nw$$

$$nt \cdot \sin \theta t = ns \cdot \sin \theta s = nw \quad (2)$$

In equations (2), θt, θs, θu, and θv are the angles of light path in the respective media.

Consequently, the light path-changing optical element 10 is required to output, toward the light-path front side, light comprising at least light components having an angle θt satisfying the following requirement.

sin θt>nw/nt

Preferably, the optical element 10 outputs, toward the light-path front side, light comprising the largest possible proportion of light components having an angle θt satisfying that requirement. When the transparent medium w is air, then nw=1 and the requirement shown above is as follows.

sin θt>1/nt

On the other hand, the light-selecting optical element 12 is regulated so as to transmit only light satisfying the following requirement.

sin θs>nw/ns

When the transparent medium w is air, then nw=1 and the requirement shown above is as follows.

sin θs>1/ns

Next, the flat light source 4 is explained.

The flat light source 4 emits planar incident light toward the total-reflection optical member 2. As this incident light can be used either collimated light or diffused light. Besides the constitution in which incident light is introduced from outside the total-reflection optical member 2, use may be made of a constitution in which the total-reflection optical member 2 has a light source inside and this light source emits light. In the case of collimated light, incident light comprising components having a specific incidence angle can be supplied to the total-reflection optical member 2 to thereby improve the efficiency of light utilization. In the case of diffused light, on the other hand, any desired low-cost flat light source can be used. In the case where the optical member 2 has a light source inside, the efficiency of light introduction is improved because the light emitted by the light source is directly introduced into the total-reflection optical member 2. In addition, since the optical element and the light source can be produced by monolithic molding, a reduction in size and thickness can be attained. On the other hand, in the case where a light source is disposed outside, the degree of design freedom in designing the display element 100 is improved and any desired large external flat light source can be utilized. Namely, a higher output can be easily attained.

As the incident light can be used light having a specific wavelength region band, such as UV light, visible light, e.g., blue light or green light, or infrared light.

Kinds of usable light sources include, for example, discharge lamps which are electronic tubes containing an inert gas or mercury vapor enclosed therein and can be generally used and be utilized as they are, such as fluorescent lamps, mercury lamps, neon tube lamps, and Crookes tubes, lasers, with which collimated light is easily obtained, LEDs, which are inexpensive and emit light having a given wavelength region, inorganic or organic ELs, with which planar light is obtained, incandescent lamps, which emit white light from which any desired wavelength component can be taken out through filtration according to purposes, cathode-ray lamps which are cathode-ray display tubes such as CRTs and with which planar light to be introduced into the display element is directly obtained, and FEDs which also are flat display tubes and with which planar light is directly obtained.

In the case of using such light sources other than those with which planar light is directly obtained, the flat light source may be constituted, for example, by collecting point light sources or line light sources so as to form planar light. Alternatively, one or more light beams may be deflected with scanning to thereby form planar light. Furthermore, use may be made of a constitution in which light from a point light source or line light source is merely passed through a filter in which diffusion/scattering, refraction, diffraction, or the like occurs to thereby form planar light and this planar light is directed toward the total-reflection optical member 2.

Modes for collecting point light sources or line light sources include: a constitution in which LEDs, for example, are two-dimensionally arranged to form a matrix pattern and emit light so as to result in an even quantity of light; a constitution in which florescent tubes, for example, are arranged side by side and caused to emit light; and the like. Modes for deflection with scanning include: a constitution in which a laser beam from, for example, a semiconductor laser, a gas laser, or the like is deflected with scanning by means of a polygonal mirror to thereby obtain planar light; a constitution in which a flat display element as a whole is evacuated and sealed and this element is scanned with a cathode ray to cause the phosphor to show excitation luminescence; and the like. In the case of a laser beam, planar light can be more efficiently obtained by employing a multibeam which forms two or more irradiation spots. In any case, any light sources such as point light sources or line light sources can be used as long as planar light equal to that emitted by a flat light source can be obtained therewith.

Furthermore, besides being irradiated with planar light formed beforehand with a light source, the total-reflection optical member 2 may be irradiated by directly introducing light from a point light source or line light source while scanning the total-reflection optical member 2 with the light successively. In this case, the above-described scanning with a laser beam can, for example, be advantageously utilized.

Figure 8:
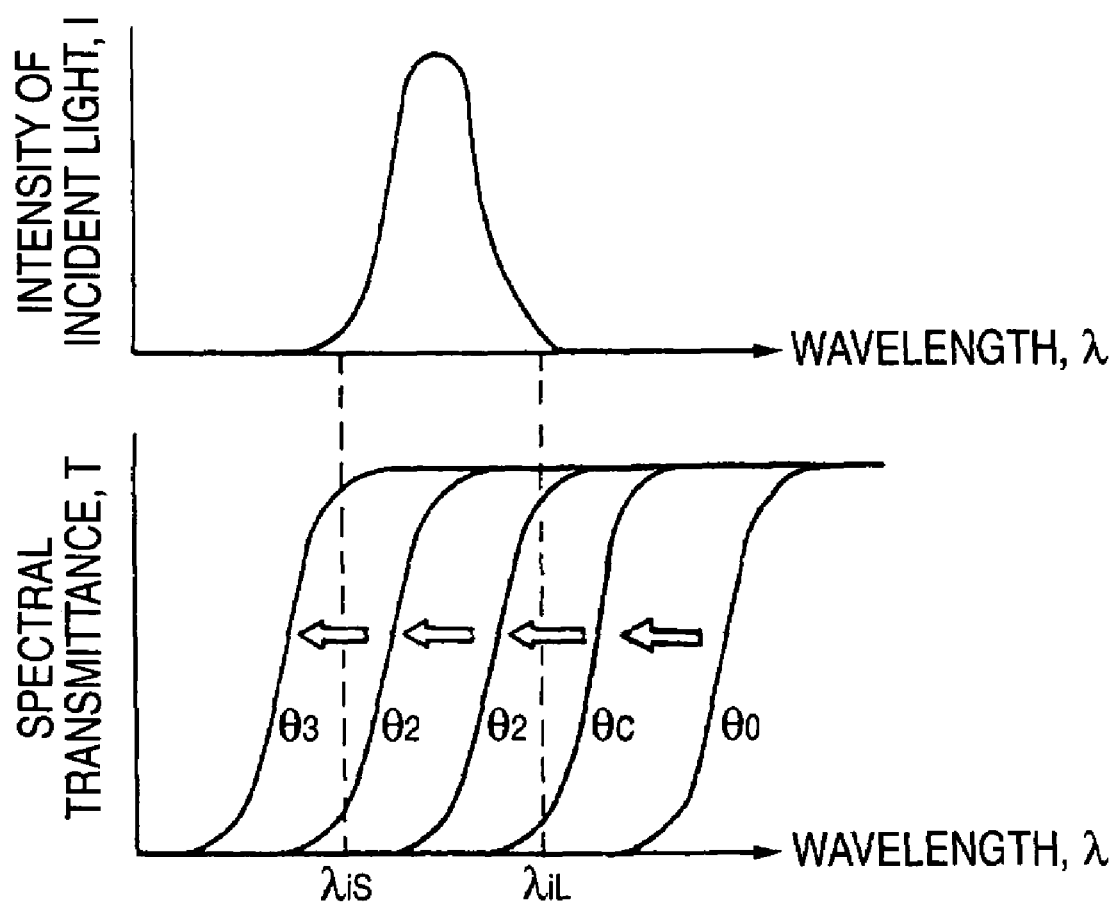
FIG. 8 is graphs showing the relationship between incident light wavelength and the spectral transmittance of a light path-selecting optical element, with respect to each of incidence angles.
Figure 9:
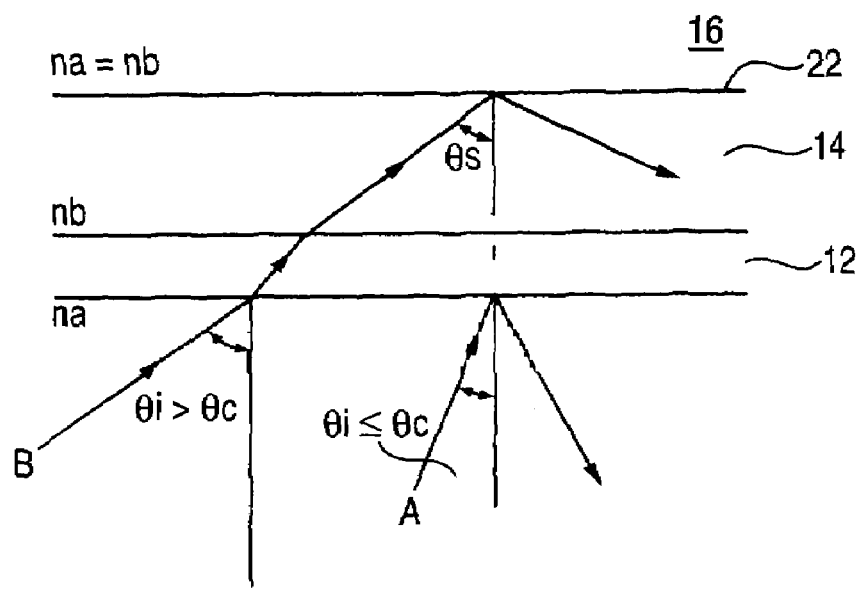
FIG. 9 is views illustrating light paths in and outside a light path-selecting optical element.
Figure 9:
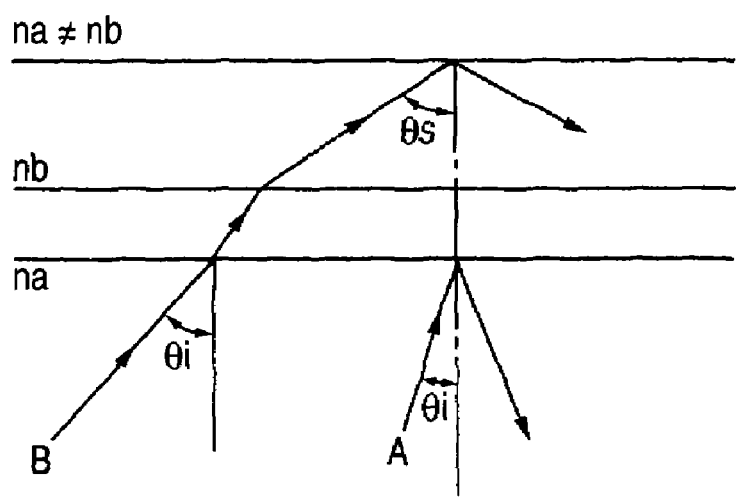

Properties of the light path-selecting optical element 12 are explained next in detail by means of FIG. 7 to FIG. 9.

Figure 7:
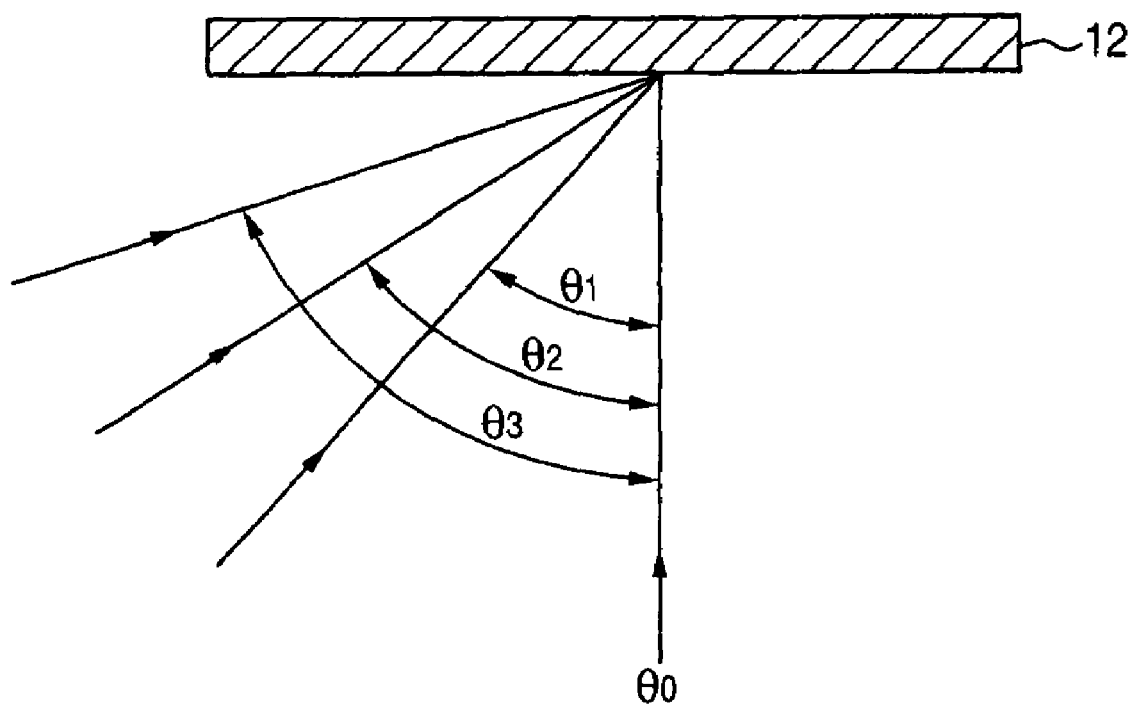
FIG. 7 is a view illustrating incidence angles of light striking on a light-selecting optical element.

FIG. 7 shows incidence angles of light striking on the optical element 12. FIG. 8 is graphs showing the relationship between incident light wavelength and the spectral transmittance of the optical element 12, with respect to each incidence angle. FIG. 9 is views illustrating light paths in and outside the optical element 12.

First, the case in which incident light is caused to strike on the optical element 12 at an incidence angle of each of $\theta_0$, $\theta_1$, $\theta_2$, and $\theta_3$ as shown in FIG. 7 is discussed. In this case, the spectral transmittance of the optical element 12 changes as shown in FIG. 8. Namely, when the incidence angle is $\theta_0$ (0 degree), which is not larger than the critical total reflection angle $\theta_c$, then the spectral transmittance is about 0% in the wavelength region for the incident light of from $\lambda_{iS}$ to $\lambda_{iL}$ and the incident light is shut off (the light does not pass through and is reflected). On the other hand, when the incidence angle is larger than the critical total reflection angle $\theta_c$, then the optical element 12 shows such spectral transmittance characteristics that as the incidence angle increases from $\theta_1$ through $\theta_2$ to $\theta_3$, the wavelength of the light shifts to the shorter-wavelength side and, hence, the quantity of light transmitted increases. Namely, as the angle between the incident light striking on the light path-selecting optical element 12 and the plane of the optical element 12 becomes smaller, the wavelength of the incident light selectively reflected shifts to the shorter-wavelength side. Thus, incident light comprising components having an incidence angle of $\theta_0$ does not pass through, and incident light comprising components having an incidence angle of $\theta_1$, $\theta_2$, or $\theta_3$, which each is larger than the specific angle, passes through; the degree of transmission thereof increases in the order of $\theta_1/\theta_2/\theta_3$. Consequently, when the optical element 12 is designed so as to have such spectral properties that only the incident light components having an angle larger than the critical total reflection angle $\theta_c$ at a given interface pass therethrough, then it is possible to shut off any incident light component which does not satisfy the condition of total reflection and to selectively release from the optical element 12 only the incident light components which are totally reflected.

An explanation is made below by reference to FIG. 9 on light paths of incident light in the case of constituting a total-reflection optical member 2 using an optical element 12 designed so that only the incident light components having an angle larger than the critical total reflection angle $\theta_c$ at the total reflection plane 22 pass therethrough.

FIG. 9(a) shows light path A, along which light striking on the light path-selecting optical element 12 is reflected by the optical element 12, and light path B, along which light striking on the light path-selecting optical element 12 passes through the optical element 12 and is totally reflected at a total reflection plane 22, which is the interface between a transparent medium 14 and a transparent medium 16 which are disposed on the light-path front side.

Light path A shows the case in which the incidence angle $\theta_i$ of the incident light is not larger than the critical total reflection angle $\theta_c$ at the total reflection plane 22. The optical element 12 does not transmit light comprising components having such an incidence angle and selectively reflects it at the surface thereof. Because of this, the light comprising components having an incidence angle not larger than the critical total reflection angle $\theta_c$ is shut off from the light-path front side by the optical element 12.

Light path B shows the case in which the incidence angle $\theta_i$ of the incident light is larger than the critical total reflection angle $\theta_c$ at the total reflection plane 22. The optical element 12 transmits light comprising components having such an incidence angle. Because of this, the light comprising components having an incidence angle larger than the critical total reflection angle $\theta_c$ passes through the optical element 12 and is introduced into the transparent medium 14 and totally reflected at the total reflection plane 22.

The cases shown in FIG. 9(a) are ones in which the refractive index na of the side through which incident light is introduced is equal to the refractive index nb of the transparent medium 14 and the angle of incidence $\theta_i$ on the optical element 12 is equal to the angle of incidence $\theta_s$ on the total reflection plane 22.

On the other hand, FIG. 9(b) shows the cases in which the refractive index na of the side through which incident light is introduced differs from the refractive index nb of a transparent medium 14 and the angle of incidence $\theta_i$ on an optical element 12 differs from the angle of incidence $\theta_s$ on a total reflection plane 22. The optical element 12 in these cases has been designed so that the angle of incidence $\theta_s$ on the total reflection plane 22 is larger than the critical total reflection angle $\theta_c$.

When the light path-selecting optical element 12 thus designed is used to constitute a total-reflection optical member 2, this optical member 2 functions in the following manner. When planar incident light which comprises collimated light or diffused light and has been introduced into the total-reflection optical member 2 is injected into the light path-changing optical element 10, then the light proceeds from the light irradiation position along changed light paths due to diffusion, etc., as shown by arrows in FIG. 1. After the light whose path has changed reaches the light path-selecting optical element 12, only the incident light comprising components having an angle larger than the critical total reflection angle $\theta_c$ at the total reflection plane 22, i.e., the interface between the transparent medium 14 and the transparent medium 16, passes through the optical element 12, while the incident light components having any other angle are selectively reflected at the surface of the optical element 12 toward the light incidence side.

Consequently, of the light injected into the total-reflection optical member 2, only the light which is to be totally reflected at the total reflection plane 22 is introduced toward the light-path front side and this light introduced is totally reflected at the total reflection plane 22. Namely, the light path-selecting optical element 12 has such a property that substantially all the transmitted light going out of the optical element 12 has components having an angle larger than the critical total reflection angle at the total reflection plane located on the incident light light-path front side of the light path-selecting optical element 12 and that the incident light components having any other angle are selectively reflected and do not pass therethrough. In the medium having a total reflection plane, substantially none of light transmission, accumulation, confinement, and the like occurs.

Part of the light which has been reflected at the surface of the light path-selecting optical element 12 toward the incident-light introduction side is reflected at the light-incidence-side interface (reflection layer) of the light path-changing optical element 10 and caused to strike again on the light path-selecting optical element 12. This light thus striking again has an enlarged incidence angle larger than the critical total reflection angle $\theta_c$, passes through the optical element 12, and is introduced into the transparent medium 14.

Next, the light-coupling elements 6 are explained.

The light-coupling elements 6 serve to disturb a condition of the total reflection of incident light at the total reflection plane, couple with and take out the light, and direct it toward the light-path front side. These light-coupling elements 6 are suitably provided with a light path deflector which changes the path of the light taken out and with a specific-wavelength-component-absorbing means which absorbs a component having a specific wavelength. Specifically, the kinds shown under the following (1) to (4) can be utilized.

(1) Ones Changing Light Path by Refraction or Ones Having This Function

Figure 10:
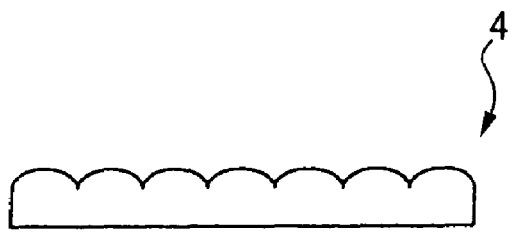
FIG. 10 is views illustrating light-coupling elements which changes a light path based on refraction: (a) is a lens array; (b) is a prism array; and (c) is a photograph showing a graded-index lens body.
Figure 10:
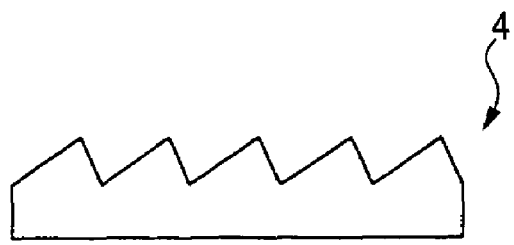
Figure 10:
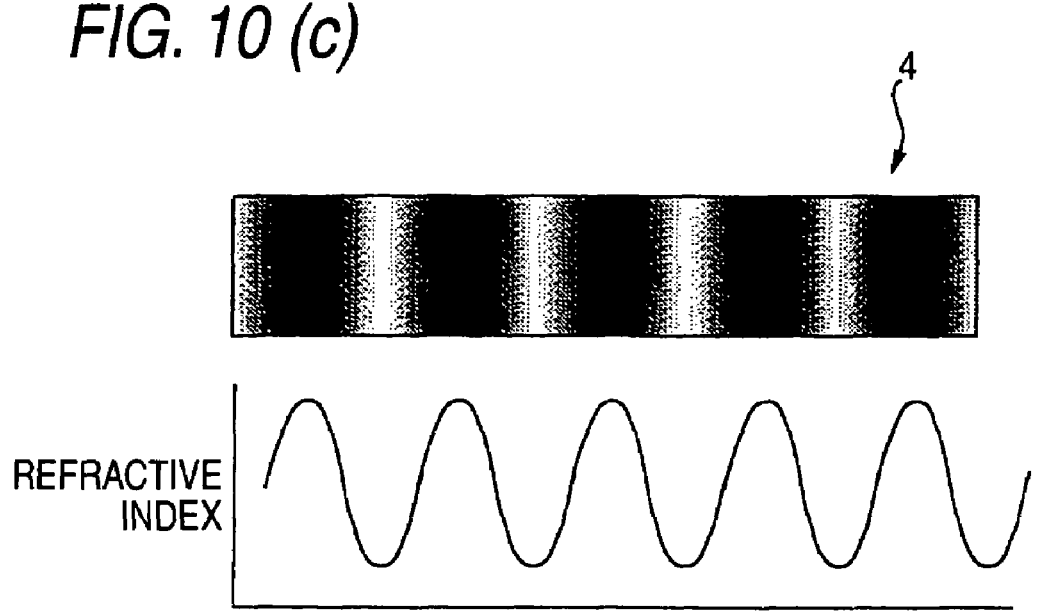

Light path deflectors which change, based on refraction, the path of the output light taken out by bringing light-coupling elements 6 near to the total reflection plane 22. Examples thereof include the lens array shown in FIG. 10(a), prism array shown in FIG. 10(b), graded-index lens body shown in FIG. 10(c), and the like. According to the lens array or prism array, the output light taken out through the total reflection plane 22 of the total-reflection optical member 2 can be converged or be diffused and directed toward different directions. Thus, imparting outgoing directional properties to output light or eliminating the outgoing directional properties of output light can be attained with a simple constitution without lowering the intensity of the output light.

(2) Transmission type Diffraction Gratings or Ones Having This Function

Examples of transmission type diffraction gratings which transmit the light taken out and change the outgoing direction based on diffraction include the volume hologram shown in FIG. 3(a), relief type diffraction grating shown in FIG. 3(b), and refractive-index-modulating diffraction grating shown in FIG. 3(c), as stated above, and further include amplitude-modulating diffraction gratings and the like. According to these transmission type diffraction gratings, the outgoing angle of output light can be precisely regulated. Furthermore, such optical elements can be mass-produced, for example, by the photopolymer method or injection molding method and the cost of the display element itself can be reduced.

(3) Light-diffusing or Light-scattering Objects or Ones Having This Function

Figure 11A:
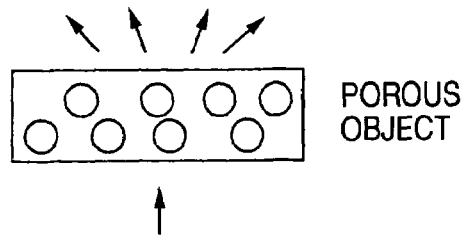
FIG. 11 is views illustrating light-coupling elements which diffuse or scatter light taken out: (a) is a porous object; (b) is an object containing a substance with a different refractive index, e.g., high-refractive-index fine particles, dispersed or distributed therein; and (c) is a light-diffusing or light-scattering object having irregularities on a surface thereof.
Figure 11:
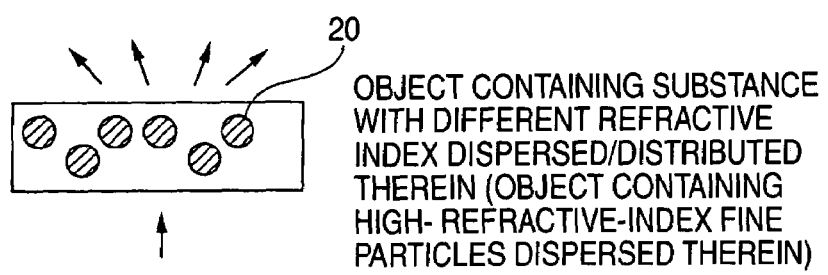
Figure 11:
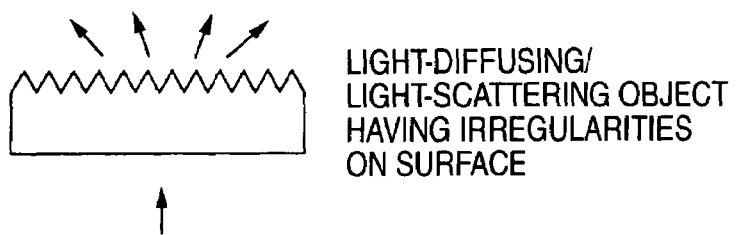

Examples of light-diffusing or light-scattering objects which diffuse or scatter the light taken out include the porous object shown in FIG. 11(a), which is suitable for mass production, the object containing a substance 20 with a different refractive index, e.g., high-refractive-index fine particles, dispersed or distributed therein as shown in FIG. 11(b), the light-diffusing or light-scattering object having irregularities on a surface thereof as shown in FIG. 11(c), and the like. According to these light-diffusing or light-scattering objects, output light can be scattered to any desired directions by means of diffusion or scattering or the outgoing directional properties of the output light can be eliminated.

(4) Ones Absorbing Incident Light or Ones Having This Function

Examples of ones absorbing incident light include, for example, transmitting image films in which image data have been recorded. When the output light taken out through the total reflection plane 22 of the total-reflection optical member 2 is released after components thereof having a specific wavelength are absorbed by such a transmitting image film, then high and low image densities and a specific color can be obtained. Namely, a display image according to the image recorded in the transmitting image film can be produced. Consequently, even when the same incident light is used, outgoing lights of two or more colors can be selectively obtained.

The light-modulating action of the display element 100 constituted of the total-reflection optical member 2, flat light source 4, and light-coupling elements 6 described above is explained below.

When light from the flat light source 4 is introduced into the total-reflection optical member 2 shown in FIG. 1, the light which has passed through the light path-changing optical element 10 and light path-selecting optical element 12 is totally reflected at the total reflection plane 22 of the total-reflection optical member 2. In the area in which a light-coupling element 6 is located close to this total reflection plane 22, a condition of total reflection at the total reflection plane 22 is distributed and light is taken out of the total reflection plane 22 by the light-coupling element 6. The light taken out is released as display light toward the viewing side, which is the side opposite to the total-reflection optical member 2. On the other hand, in the areas in which light-coupling elements 6 remain apart from the total reflection plane 22, incident light is totally reflected at the total reflection plane 22 and does not go out toward the viewing side.

As described above, in the display element 100 according to this embodiment, gap distance and film evenness can be considerably reduced because of the simple constitution of the light-coupling elements. This display element has a constitution highly suitable for the attainment of a larger area.

According to the display element 100 having the constitution described above, incident light from the planar light source is directly introduced into the total-reflection optical member 2 at a high efficiency while retaining the planar state with the low-cost constitution without using a lightguide plate or photowaveguide. Because of this, as compared with, for example, the case in which incident light is introduced through an edge, the area through which incident light is to be introduced can be exceedingly widened and the efficiency of coupling with incident light is improved. Totally reflected planar light can hence be introduced at a high efficiency without being influenced by a reduction in the thickness of the display element 100 itself. As a result, the incident light taken out of the total reflection plane 22 in the area in which light-coupling elements 6 are disposed close to the total reflection plane can be emitted toward the viewing side at a high efficiency. Consequently, on the light-path front side of the display element 100, only the area in which light-coupling elements 6 are disposed shines to image-wise release light from the display element 100. Namely, an image can be produced in a necessary area only. Furthermore, according to this constitution, the local decrease in light quantity due to crosstalk caused by the use of a lightguide plate or photowaveguide is prevented and image displaying with even brightness is possible over the whole picture.

Since part of the incident light reflected at each interface within the display element 100 is directed again toward the light-path front side by means of reflection at the interfaces, etc., a higher output also can be easily attained in the display element 100. In addition, since the total-reflection optical member 2 itself releases substantially no transmitted light, the light introduced does not attenuate and the efficiency of light utilization can be improved. When that gas contact interface of the total-reflection optical member 2 at which this optical member is in contact with air (which may be replaced by an inert gas) is designed so as to be a total reflection plane, then the necessity of separately forming a layer having a refractive index causing total reflection is eliminated and the structure can be simplified.

Furthermore, the position in which a flat light source is to be disposed can be freely selected or many light sources can be mounted. Thus, light can be emitted at an improved luminance. Moreover, since there are no limitations on the distribution of incident light angles for the flat light source, an existing backlight can be used. Although omitted in the figure, a reflector with which the incident light reflected by this display element 100 is directed again toward the display element 100 may be disposed on the incident-light introduction side of the display element 100. Thus, light recycling occurs and the efficiency of light utilization is improved to attain a higher efficiency.

The second embodiment of the invention constituted by two-dimensionally arranging display elements described above will be explained below by means of FIG. 12 and FIG. 13.

Figure 12:
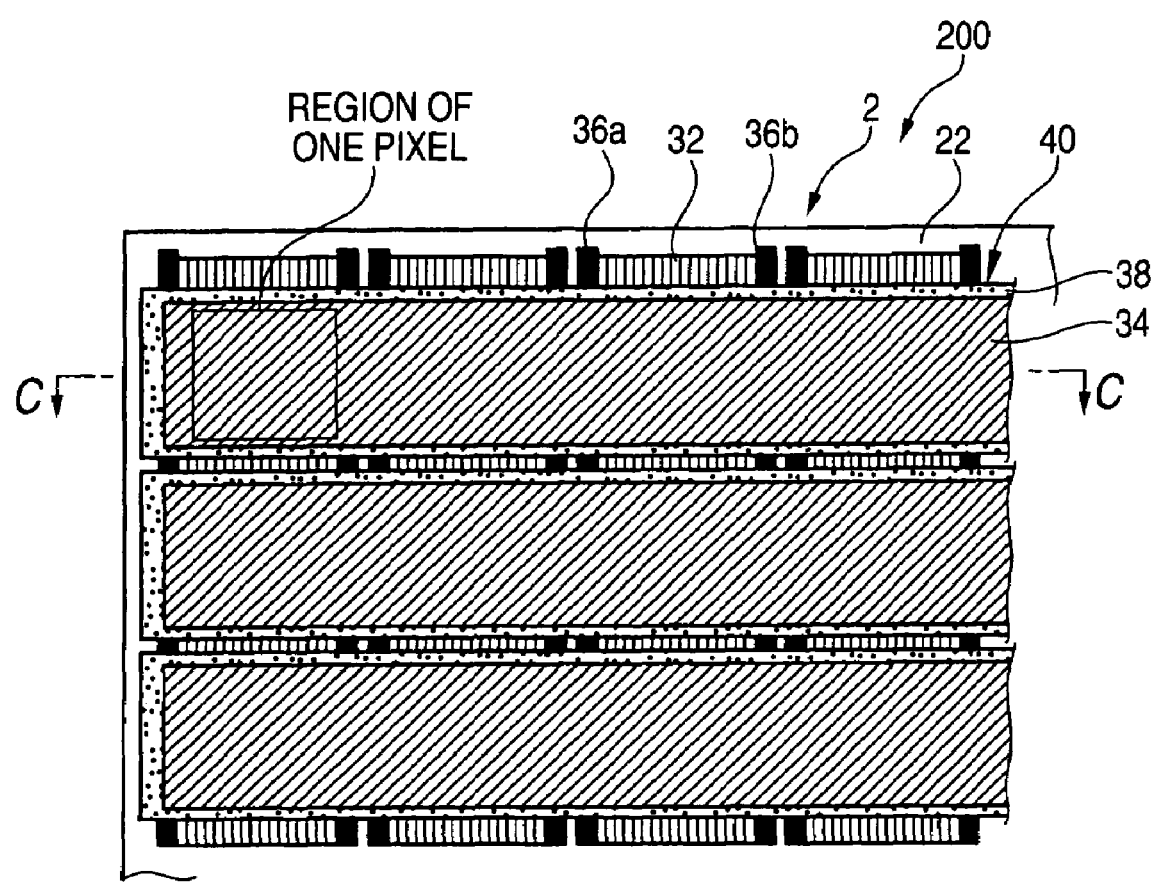
FIG. 12 is a plan view of a flat display element comprising two-dimensionally arranged display elements employing a flexible thin film.
Figure 13:
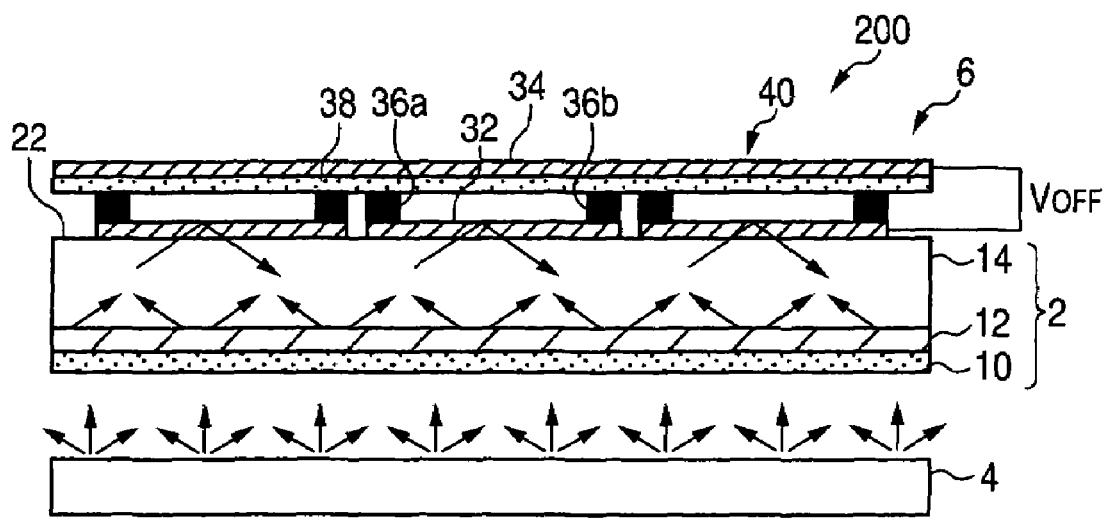
FIG. 13 is sectional views taken on C—C of FIG. 12; (a) is a view illustrating the OFF state and (b) is a view illustrating the ON state.
Figure 13:
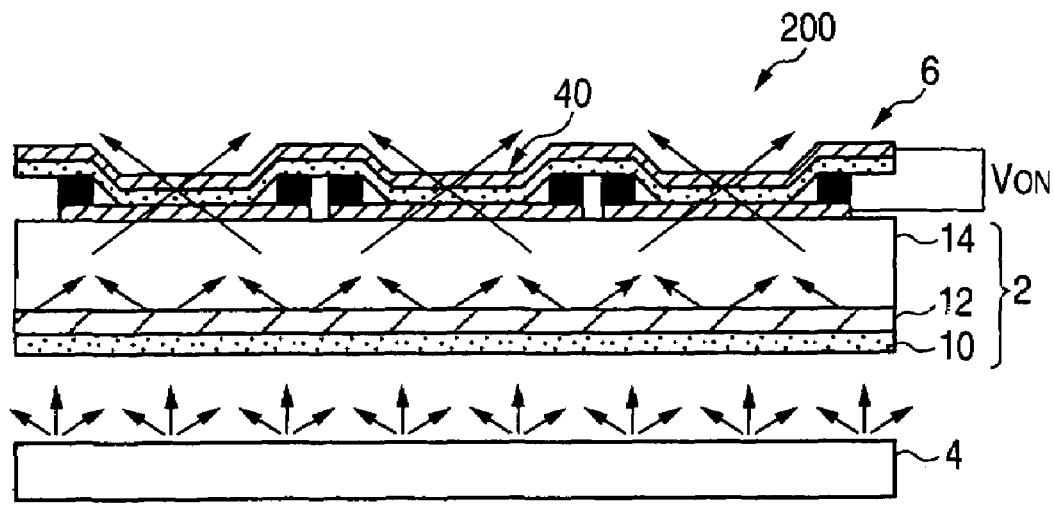

FIG. 12 is a plan view of a flat display element comprising two-dimensionally arranged display elements employing a flexible this film. FIG. 13 is sectional views taken on C—C of FIG. 12; (a) is a view illustrating the OFF state and (b) is a view illustrating the ON state.

As shown in FIG. 12 and FIG. 13, the flat display element 200 according to this embodiment comprises a total-reflection optical member 2 and light-coupling elements 6 disposed over the total reflection plane 22 of the optical member 2 in two-dimensional arrangement with m lines and n rows (m and n are integers). Specifically, signal electrodes 32 transparent to incident light have been arranged in parallel in the row direction so as to constitute n rows over the total reflection plane 22, and scanning electrodes 34 likewise transparent to incident light have been arranged in parallel in the line direction perpendicular to the signal electrodes 32 so as to constitute m lines over the signal electrodes through a pair of columnar materials 36a and 36b disposed on both sides of each signal electrode. The scanning electrodes 34 have, formed on the side thereof facing the signal electrodes 32, a light-diffusing layer 38 having electrical insulating properties; the scanning electrodes 34 in cooperation with the light-diffusing layer 38 constitute a flexible thin film.

As the light-diffusing layer having electrical insulating properties can be used an inorganic insulating film of, e.g., $SiO_2$ or $SiN_x$ or an organic insulating film of a polyimide or the like. For forming the gap between the flexible thin film and the signal electrodes, use can be made of a method which comprises forming a sacrifice layer beforehand in the gap parts, forming the flexible thin film thereon, and then finally removing the sacrifice layer by etching to obtain the gap. Light-diffusing properties can be imparted to the flexible thin film, for example, by a method in which irregularities are formed on a surface thereof by photolitho etching or the like or a method in which fine particles having a different refractive index are dispersed in the insulating film.

The light-modulating actin of the flat display element 200 having the constitution described above is explained below. First, when the voltage between the signal electrodes 32 and the scanning electrodes 34 is an OFF-state voltage Voff, then the flexible thin film 40 is in a neutral flat state and the light introduced into the total-reflection optical member 2 is not released toward the viewing side, as shown in FIG. 13(a).

On the other hand, when a driving voltage Von is applied between the signal electrodes 32 and the scanning electrodes 34, then an electrostatic force generates between the signal electrodes 32 and the scanning electrodes 34 and the flexible thin film 40 is adsorbed onto the signal electrodes 32, as shown in FIG. 13(b). As a result, a condition of total reflection is disturbed in the areas where the flexible thin film 40 has been adsorbed to the signal electrodes 32 and the light introduced into the total-reflection optical member 2 is taken out through the signal electrodes 32 and the flexible thin film 40. This light taken out is released toward the viewing side.

As described above, according to the flat display element 200 having the constitution described above, a light-diffusing action is obtained by separating or contacting the flexible thin film 40 from or with the signal electrodes 32 by means of an electromechanical motion, and this light-diffusing action makes light modulation possible. Namely, when a gap is present between the flexible thin film 40 and the signal electrodes 32, a condition of total reflection within the total-reflection optical member 2 is satisfied and light from the signal electrodes 32 is shut off. On the other hand, when the flexible thin film 40 is brought into contact with the signal electrodes 32, then the condition of total reflection is disturbed and light from the signal electrodes 32 is introduced into the flexible thin film 40. This light introduced is diffused by the light-diffusing layer 38 in the flexible thin film 40, whereby light can be released from the thin flexible film 40.

Next, the third embodiment of the invention in which ultraviolet is modulated with the display element of the invention to cause phosphors to show excitation luminescence will be explained.

Figure 14:
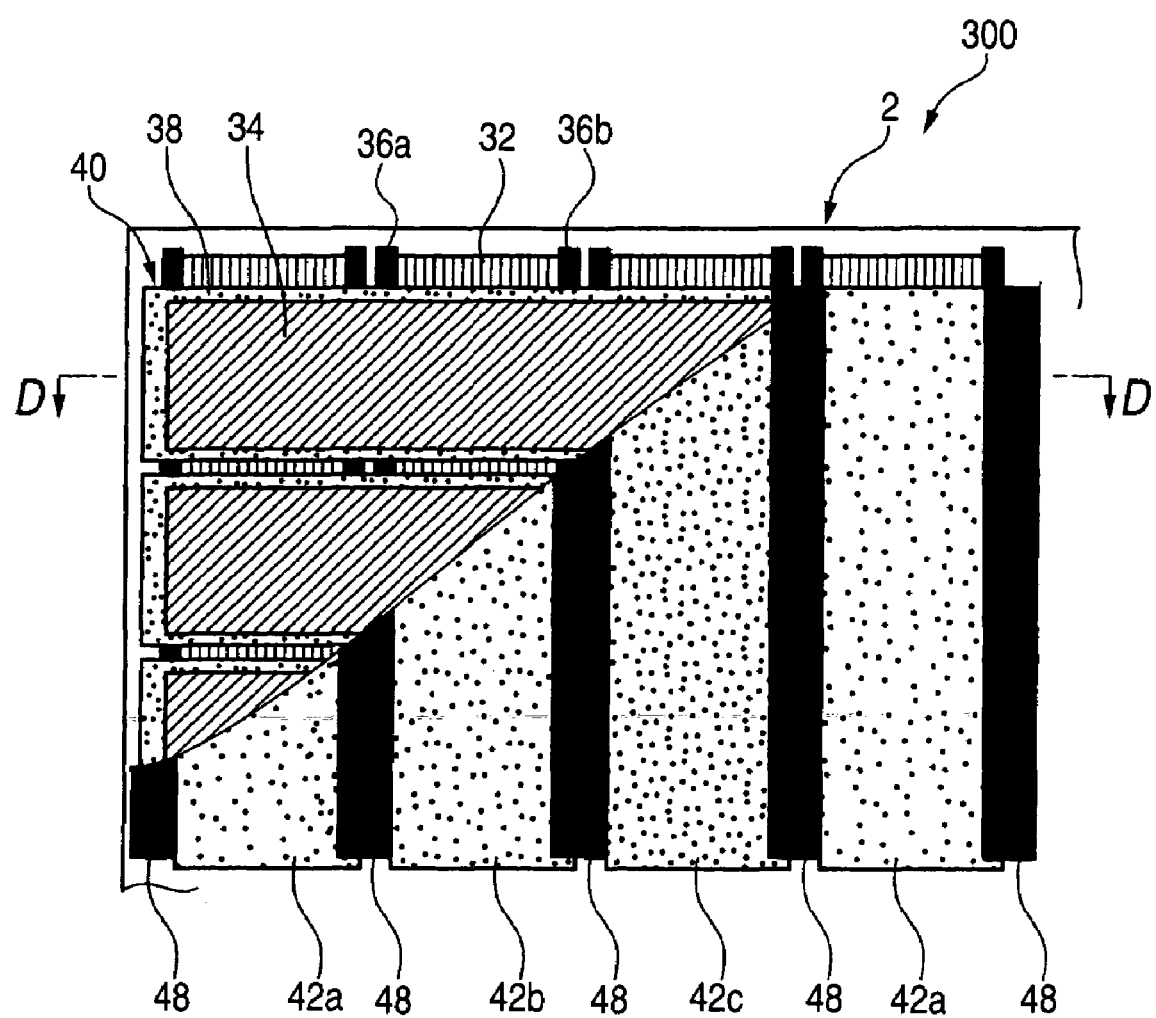
FIG. 14 is a plan view of an excitation luminescence type flat display element comprising a flat display element and phosphors disposed on the viewing side thereof.
Figure 15:
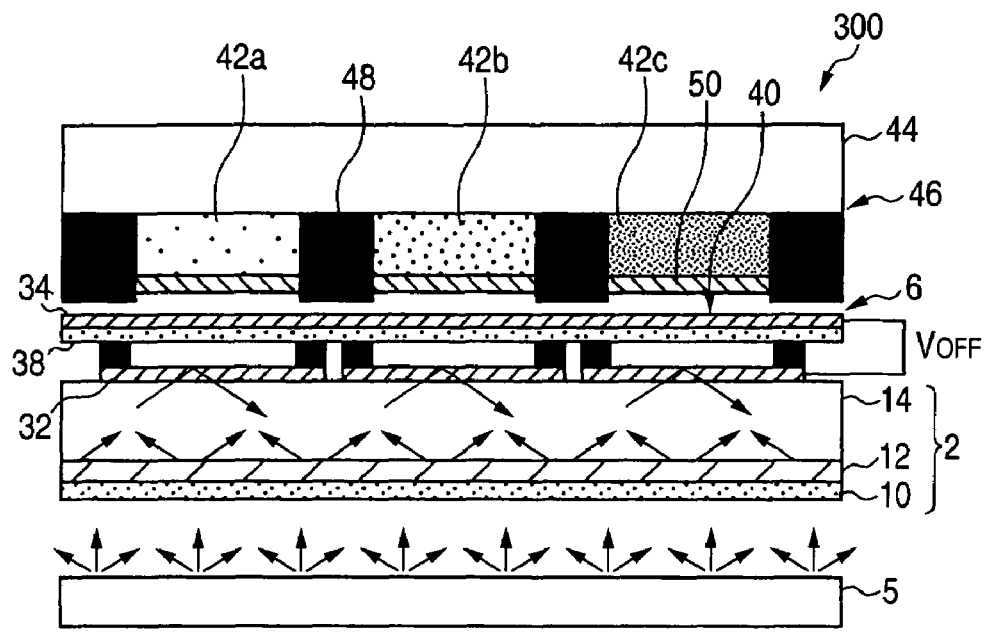
FIG. 15 is sectional views taken on D—D of FIG. 14; (a) is a view illustrating the OFF state and (b) is a view illustrating the ON state.
Figure 15:
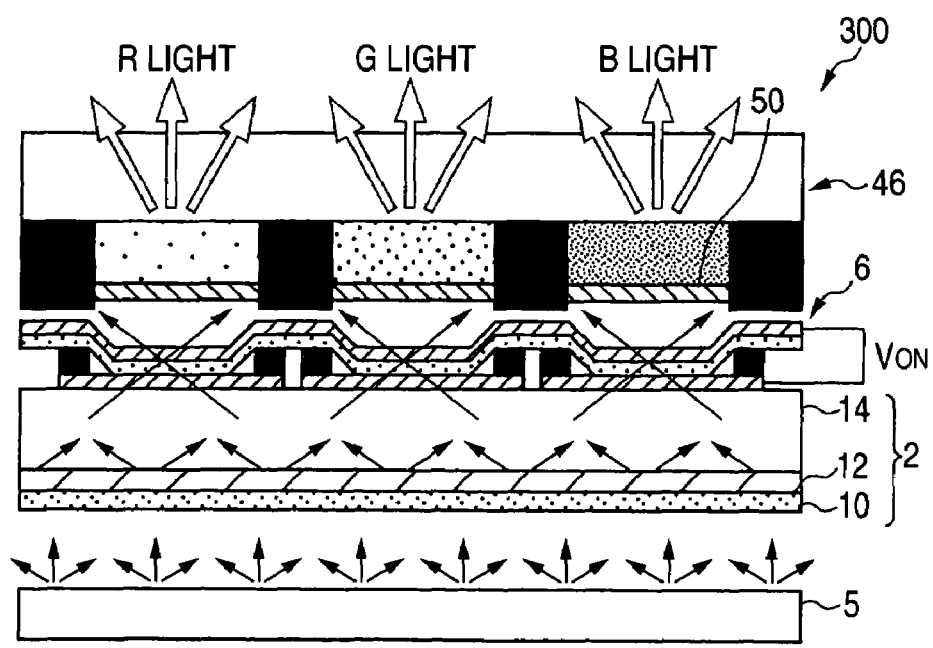

FIG. 14 is a plan view of an excitation luminescence type flat display element comprising the flat display element described above and phosphors disposed on the viewing side thereof. FIG. 15 is sectional views taken on D—D of FIG. 14; (a) is a view illustrating the OFF state and (b) is a view illustrating the ON state.

As shown in FIG. 14 and FIG. 15, the excitation luminescence type flat display element 300 according to this embodiment has the same constitution as the flat display element 200 described above, except that the flat light source 4 has been replaced with a UV flat light source 5 which emits planar UV light and that a front-side plate 46 comprising a transparent substrate 44 and phosphors formed thereon has been disposed so as to face the flexible thin film 40 of the total-reflection optical member 2.

The front-side plate 46 has stripe phosphors 42a, 42b, and 42c of the three primary colors (R, G, and B) disposed so as to face the signal electrodes 32 of the flat display element 200. These stripe phosphors 42a, 42b, and 42c are partitioned by a black matrix 48 for improving contrast ratio. The block matrix 48 in this case can be formed from a resin containing carbon dispersed therein or from a metal such as chromium.

For the front-side plate 46 may be used a material, e.g., a glass, which transmits wavelengths of the light emitted by the phosphors. Furthermore, a wavelength-selective reflecting film 50 which transmits ultraviolet for excitation and reflects wavelengths of the light emitted by the phosphors has been disposed on the phosphors on their side facing the flexible thin film 40. This reflecting film 50 transmits light from the UV flat light source, and the light emitted by the phosphors is reflected by the film 50 toward the viewing side. Due to this constitution, the quantity of light used for image production can be increased. As this wavelength-selective reflecting film 50 can be used, for example, a dielectric multilayer film or a cholesteric liquid-crystal material.

The signal electrodes 32 and scanning electrodes 34 are constituted of an electroconductive material transparent to the light to be introduced. Preferred is a material which transmits ultraviolet for excitation or a material having this optical property. Specifically, ITO or the like can be used. It is more preferred to superpose a thin film of a metal, such as aluminum, an alloy thereof, chromium, molybdenum, or tantalum, on edges of the transparent electroconductive material. Thus, the resistance of the electrodes can be reduced and a delay in voltage application can be diminished.

The light-modulating actin of the excitation luminescence type flat display element 300 having the constitution described above is explained next. First, when the voltage between the signal electrodes 32 and the scanning electrodes 34 is a non-driving voltage Voff, then the flexible thin film 40 is in a neutral flat state and the UV light introduced into the total-reflection optical member 2 is not released toward the front-side plate 46, as shown in FIG. 15(a).

On the other hand, when a driving voltage Von is applied between the signal electrodes 32 and the scanning electrodes 34, the flexible thin film 40 is adsorbed onto the signal electrodes 32 by an electrostatic force. As a result, a condition of total reflection is disturbed and, hence, the UV light introduced into the total-reflection optical member 2 is taken out through the signal electrodes 32 and the flexible thin film 40 and emitted toward the front-side plate 46. The UV light thus emitted passes through the wavelength-selective reflecting film 50 of the front-side plate 46 and selectively strikes on and excite the phosphors 42a, 42b, and 42c to cause the phosphors to luminesce. The lights (R, G, and B colors) thus generated by excitation are released toward the viewing side. On the other hand, the lights generated by excitation and directed toward the direction opposite to the viewing side are reflected by the wavelength-selective reflecting film 50 and released toward the viewing side.

As described above, according to the excitation luminescence type flat display element 300 having the constitution described above, when the flexible thin film 40 is separated from the signal electrodes 32 due to an electromechanical motion and a gap is present between the film 40 and the electrodes 32, then a condition of total reflection within the total-reflection optical member 2 is satisfied and light from the signal electrodes 32 is shut off. On the other hand, when the flexible thin film 40 is in contact with the signal electrodes 32, then the condition of total reflection is disturbed and light from the signal electrodes 32 passes through the flexible thin film 40 and is emitted toward the front-side plate 46 to selectively excite the phosphors 42a, 42b, and 42c to cause luminescence. Thus, the luminescence of the phosphors located in any desired positions can be selectively controlled. Moreover, since the UV light introduced in a planar state strikes as it is on the phosphors to cause it to emit visible lights of the three primary colors, a colored flat image of any desired pattern can be produced with a higher efficiency of light utilization as compared with the case in which a white light source is used to produce the three primary colors with a color-absorbing color filter as in, e.g., liquid-crystal display elements.

Furthermore, the two-dimensionally arranged light-modulating elements according to the constitution described above can be made to show hysteresis in the property of changing position with applied voltage by suitably selecting factors such as the shape and mechanical properties, e.g., elastic constant, of the flexible thin film and the gap distance between the flexible thin film and the total reflection plane.

This hysteresis can be utilized to control transmittance for any desired one or more of the two-dimensionally arranged pixels with a high contrast without using an active element such as a TFT, by suitably applying a voltage between the signal electrodes 32 and scanning electrodes 34. Namely, the so-called passive-matrix operation is possible. The passive-matrix operation is a mode of display in which scanning electrodes and signal electrodes are disposed in lattice pattern arrangement and regulated by time-sharing on-off control to thereby operate the pixels located at the intersections. A typical example thereof is STN (super twisted nematic).

By thus connecting the light-modulating elements to a general passive-matrix operation system and applying a potential between the electrodes 32 and 34, an inexpensive flat display element having a large area can be realized. Furthermore, by regulating the gap distance between the flexible thin film and the total reflection plane to about 1 μm, high-speed light modulation is possible at a low voltage. In particular, when transmittance is modulated with two values to digitally regulate the time to be transmitted in a field time, then high-quality gradation suitable for dynamic images is stably obtained. In addition, since the image production is based on the luminescence of phosphors, it has no viewing angle dependence and high-quality display images are obtained.

The fourth embodiment of the invention in which ultraviolet is modulated with the display element of the invention to cause phosphors to show excitation luminescence will be explained below.

FIG. 16 is sectional views illustrating part of an excitation luminescence type flat display element according to this embodiment which includes a flexible thin film and formed thereon the phosphors of the excitation luminescence type flat display element described above; (a) is a view illustrating the OFF state and (b) is a view illustrating the ON state.

As shown in FIG. 16(*a*), the excitation luminescence type flat display element 400 according to this embodiment has no front-side plate and has phosphors 52a, 52b, and 52c directly formed on the flexible thin film 40. Thus, the constitution and molding step have been simplified, and a further reduction in thickness and a cost reduction are attained. The phosphors 52a, 52b, and 52c are partitioned by a black matrix to thereby enhance the contrast of display images.

In the third embodiment and fourth embodiment described above, UV light was used as incident light and phosphors of G (green) and R (red) colors which luminesced upon excitation by transmitted light obtained from the UV light were used to produce a full-color image. However, use may also be made of blue incident light (main wavelength region, 400–500 nm) and phosphors of G (green) and R (red) colors which luminesce upon excitation by the blue light. Combinations of incident light with phosphors are not limited to those examples. When visible light such as blue light is used as incident light, organic or other materials which are not resistant to UV light can be used as materials for constituting elements according to the invention.

It is also possible to disposed phosphors on the flexible thin film or on the light-path front side thereof and dispose, on the light-path front side of these phosphors, an optical filter which transmits components having a wavelength of the luminescence of the phosphors and shuts off components having a wavelength of incident light. According to this constitution, when UV light, for example, is used as incident light, transmitted light (leakage light) derived therefrom is prevented from being released toward the viewing side (viewer side).

Furthermore, in place of the optical filter shown above, an optical filter which transmits components having a wavelength of the luminescence of the phosphors and shuts off components having a wavelength of incident light may be disposed. According to this constitution, when an ND filter which absorbs visible light (transmittance, about from 20 to 70%) is disposed on the viewing side (viewer side) in the case where the luminescence of the phosphors, for example, has wavelengths within the visible light region, then an image with a high contrast can be produced even in a bright place.

Next, the fifth embodiment of the invention will be explained in which the light-coupling elements of the display element described above are formed from a liquid crystal and light modulation is conducted electro-optically.

Figure 17:
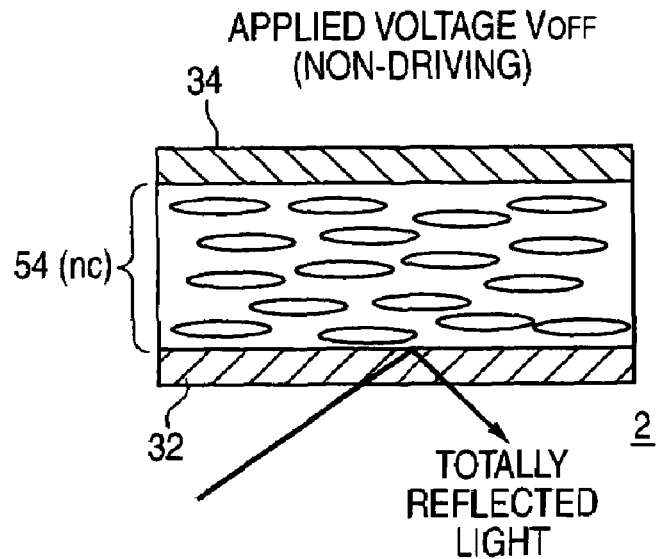
FIG. 17 is views illustrating the conceptional constitution and light-modulating action of a light-coupling element according to a fifth embodiment of the invention.
Figure 17:
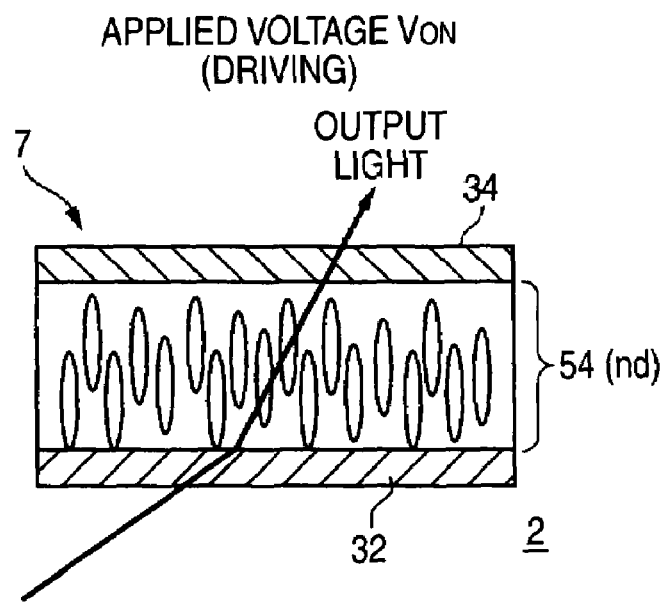

FIG. 17 is views illustrating the conceptional constitution and light-modulating action of a light-coupling element according to this embodiment. The light-coupling element 7 according to this embodiment comprises: a signal electrode 32 disposed on the total reflection plane of a total-reflection optical member 2; a scanning electrode 34 facing the signal electrode 32; and a liquid-crystal layer 54 interposed between the signal electrode 32 and the scanning electrode 34 and capable of being modulated so as to have a refractive index nc satisfying a condition of total reflection at the interface with the signal electrode 32 or have a refractive index nd disturbing the condition of total reflection.

FIG. 17(*a*) illustrates the state in which a non-driving voltage Voff is applied between the electrodes, while FIG. 17(*b*) illustrates the state in which a driving voltage Von is applied between the electrodes. In the state in which the non-driving voltage Voff is applied, the refractive index of the liquid-crystal layer 54 is regulated so as to satisfy a condition of total reflection at the interface between the signal electrode 32 and the liquid-crystal layer 54 and, hence, the light introduced into the total-reflection optical member 2 is totally reflected at the interface. Upon application of the driving voltage Von, the refractive index of the liquid-crystal layer 54 changes from nc to nd to disturb the condition of total reflection and, hence, the light introduced into the total-reflection optical member 2 is taken out and directed toward the viewing side.

As described above, according to the light-coupling element having the constitution described above, light modulation can be conducted by driving voltage control which changes the refractive index of the liquid-crystal layer 54. This modulation can be conducted more efficiently than the modulation in liquid-crystal modulating elements of the related art using a polarizer.

A light-coupling element employing a PDLC (polymer-dispersed liquid crystal) in place of the liquid-crystal layer described above can be used to constitute a display element as a modification of the embodiment described above.

Figure 18:
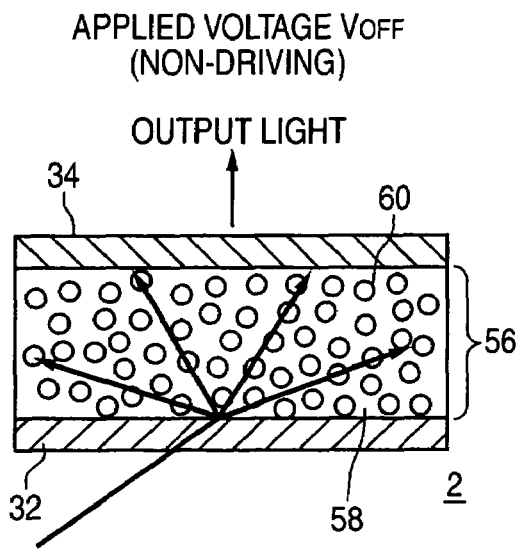
FIG. 18 is views illustrating the conceptional constitution and light-modulating action of a light-coupling element employing a PDLC.
Figure 18:
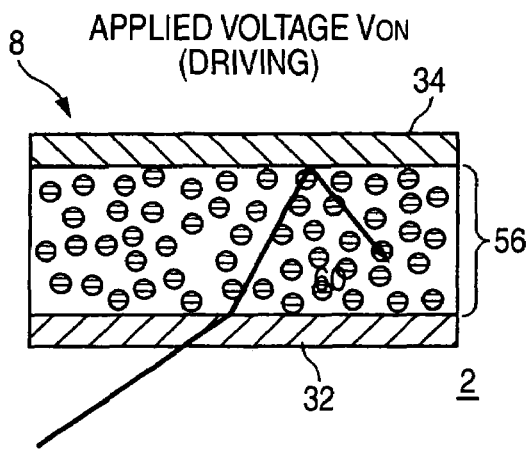

FIG. 18 is views illustrating the conceptional constitution and light-modulating action of a light-coupling element employing a PDLC. The light-coupling element 8 according to this embodiment comprises: a signal electrode 32 disposed on the total reflection plane of a total-reflection optical member 2; a scanning electrode 34 facing the signal electrode 32; and an PDLC layer 56 interposed between the signal electrode 32 and the scanning electrode 34. The PDLC layer 56 comprises a polymer layer 58 having a polymer network and minute microcapsules 60 dispersed in the layer 58 and containing a liquid-crystal layer enclosed therein. In this PDLC layer 56, when the voltage between the electrodes is a non-driving voltage Voff, then the liquid crystal is irregularly aligned to diffuse light and, hence, the light introduced is released toward the viewing side. When the voltage between the electrodes is a driving voltage Von, then the molecules of the liquid crystal are oriented and, hence, the light introduced proceeds straight through the liquid-crystal layer and is totally reflected at the front-side interface of the layer. As a result, the light is not released toward the viewing side. Thus, on-off control of light can be performed.

Other embodiments of the total-reflection optical member for use in the display element, flat display element, and excitation luminescence type flat display element described above will be explained below.

First, the fifth embodiment of the invention is explained in which a Bragg reflection filter is used as a light path-selecting optical element in place of the optical interference filter described above.

Figure 19:
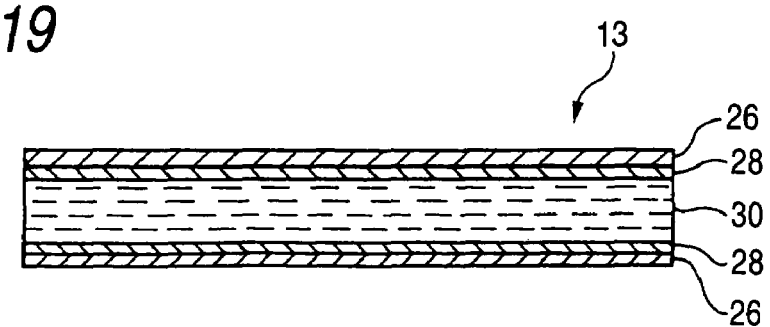
FIG. 19 is a view illustrating an example of a light path-selecting optical element comprising a liquid-crystal film.

In FIG. 19 is shown an example which employs a light path-selecting optical element 13 including a liquid-crystal film. The light path-selecting optical element 13 in this case comprises a pair of transparent electrodes 26 made of ITO or another material, an alignment layer 28 formed on the inner surface of each electrode, and a cholesteric liquid-crystal layer 30 sandwiched between the alignment layers 28.

The filtering effect of the cholesteric liquid-crystal layer 30 in this constitution is explained below. In the cholesteric liquid-crystal layer 30, molecules of the cholesteric liquid crystal are oriented parallel to the layer and have a helical structure extending vertically to the layer.

The birefringence Δn of the cholesteric liquid-crystal layer 30 can be expressed by equation (3):

$$\Delta n = ne - no \tag{3}$$

wherein no, ne, Δn, and n are the ordinary-light refractive index, extraordinary-light refractive index, birefringence, and average refractive index, respectively, of the cholesteric liquid-crystal layer 30.

The average refractive index n can be approximately expressed by equation (4).

$$n = (ne + no)/2 \tag{4}$$

Furthermore, when the helical pitch of the cholesteric liquid-crystal layer 30 is expressed by P [nm], the cholesteric liquid-crystal layer 30 shows the property of selectively reflecting based on the principle of Bragg reflection. Namely, when light which has struck on the cholesteric liquid-crystal layer 30 at an incidence angle of θ [deg] is selectively reflected, the center wavelength λ(θ) [nm] of the incident light can be expressed by equation (5).

$$\lambda(\theta) = \lambda(0) \cdot \cos[\sin^{-1}(\sin \theta / n)] \tag{5}$$

In this case, the incident light is supposed to be introduced through air (refractive index=1). In equation (5), λ(0) [nm] is the center wavelength of the light having an incidence angle of θ₀, i.e., vertically striking on the layer.

This center wavelength can be expressed by equation (6).

$$\lambda(0) = n \cdot P \tag{6}$$

Furthermore, the reflect-wavelength bandwidth Δλ [nm] can be expressed by equation (7).

$$\Delta \lambda = \Delta n \cdot P \tag{7}$$

Consequently, when the cholesteric liquid-crystal layer 30 is formed while regulating the ordinary-light refractive index no, extraordinary-light refractive index ne, and helical pitch P of the layer, then an optical film can be formed which has any desired reflect-center wavelength λ(θ), which changes depending on incidence angle θ, and a desired reflect-wavelength bandwidth Δλ. For example, regulation of helical pitch P can be achieved by a method comprising preparing the layer by mixing two or more materials differing in helical pitch.

In the case where the incident light to be used has a wide wavelength region, it is necessary to widen the range of selectively reflected wavelengths for the cholesteric liquid-crystal layer. In this case, the range of reflected wavelengths can be widened by aligning the liquid crystal so that the helical pitch continuously changes along the thickness direction. Alternatively, the range of reflected wavelengths can be widened also by superposing cholesteric liquid-crystal layers differing in the range of selectively reflected wavelengths; this element is usable as a light path-selecting optical element according to the invention.

This cholesteric liquid-crystal layer 30 can be produced in the following manner.

A polyimide alignment film is applied to a substrate on which a layer of a cholesteric liquid crystal is to be formed. This coating is dried and surface-treated with rubbing. Thus, a polyimide alignment film is formed. A liquid prepared by mixing either a low-molecular cholesteric liquid crystal or a mixture of a nematic liquid crystal and a chiral reagent for twist development with a high-molecular monomer and a photopolymerization initiator with the aid of an organic solvent is applied to the alignment film and then subjected to alignment at an appropriate temperature. Thereafter, necessary parts are exposed to ultraviolet to photopolymerize the monomer, and the unnecessary parts are removed by development. Finally, the residual layer is baked at a high temperature for stabilization.

Regulation of the direction of twist and the angle of reflection or incidence may be accomplished by suitably changing the cholesteric liquid crystal or chiral reagent and the concentrations of these.

It is also possible to use a high-molecular cholesteric liquid crystal to form a film. This film can be obtained in a manner similar to the above one. Namely, a liquid prepared by mixing the high-molecular cholesteric liquid crystal with a photopolymerization initiator with the aid of an organic solvent is applied to a polyimide alignment film and then subjected to alignment at an appropriate temperature. Necessary parts of the coating are exposed to ultraviolet to cause photopolymerization. The angle of reflection or incidence can be regulated by suitably selecting an alignment temperature and is stabilized by photopolymerization.

Figure 20:
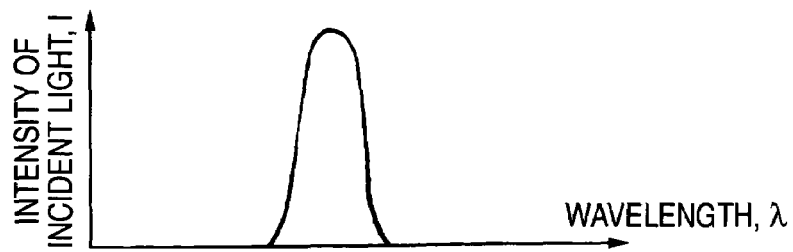
FIG. 20 is illustrations showing spectral transmittances in a light path-selecting optical element.
Figure 20:
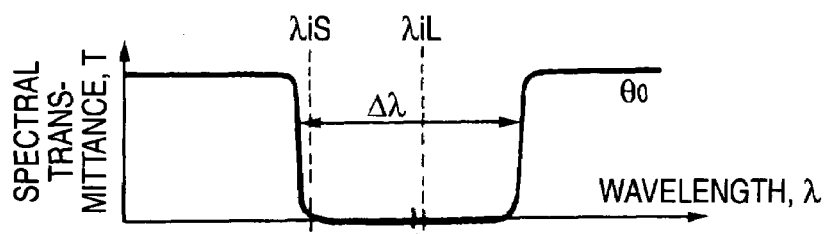
Figure 20:
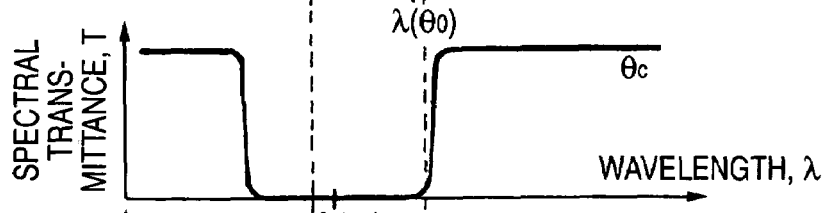
Figure 20:
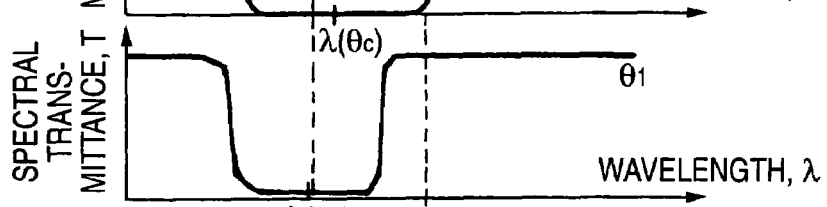
Figure 20:
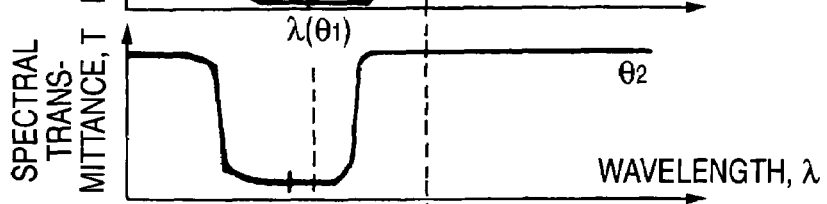
Figure 20:
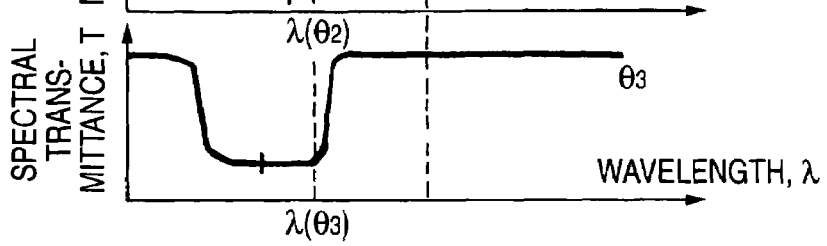

In FIG. 20 are shown spectral transmittances of the light path-selecting optical element 13 in this constitution. This cholesteric liquid-crystal layer is an example of superposed layers comprising a left-hand-twisted cholesteric liquid-crystal layer and a right-hand-twisted liquid-crystal layer, and reflects all polarized components in the reflected wavelength region. When the incidence angle is $\theta_0$, which is not larger than the critical total reflection angle $\theta_c$ (see FIG. 7), then the spectral transmittance is about 0% in the wavelength region for incident light of from $\lambda_{iS}$ to $\lambda_{iL}$ and the incident light is shut off. When the incidence angle is larger than the critical total reflection angle $\lambda_c$, then the optical element shows such spectral transmittance characteristics that as the incidence angle increases from $\theta_1$ through $\theta_2$ to $\theta_3$, the wavelength of the light shifts to the shorter-wavelength side and, hence, the quantity of light transmitted increases. Thus, incident light comprising components having an incidence angle of $\theta_0$ does not pass through, and incident light comprising components having an incidence angle of $\theta_1$, $\theta_2$, or $\theta_3$, which each is larger than the specific angle, passes through; the degree of transmission thereof increases in the order of $\theta_1/\theta_2/\theta_3$. Consequently, when the optical element 12 is designed so as to have such spectral properties that only the incident light components having an angle larger than the critical total reflection angle $\theta_c$ at a given interface pass through, then it is possible to selectively remove any incident light component which does not satisfy the condition of total reflection and to release from the optical element 12 only the incident light components which are totally reflected.

According to this constitution, not only the same effect and advantage as in the case of using the optical interference filter described above can be obtained, but also the light path-selecting optical element 13 can be realized at a lower cost.

With respect to the cholesteric liquid-crystal layer 30, when the helical structure thereof is right-hand, then the layer reflects light comprising right-hand circularly polarized components and transmits light comprising components circularly polarized left-handedly along the helix. On the other hand, when the helical structure is left-hand, then the layer reflects light comprising left-hand circularly polarized components and transmits light comprising right-hand circularly polarized light. Consequently, when light comprising all polarized components is desired to be reflected, i.e., not to be transmitted, a structure obtained by successively superposing a left-hand (or right-hand) cholesteric layer and a right-hand (or left-hand) cholesteric layer can be used to reflect all polarized light.

Besides the cholesteric liquid crystal described above, a volume hologram is effective as an optical element having the function of Bragg reflection. A volume hologram has a Bragg reflection function and reflects specific wavelengths due to a refractive-index distribution formed lattice-wise in the film. Furthermore, the wavelength of light reflected shifts to the shorter-wavelength side as the incidence angle increases. The hologram thus functions as a light path-selecting film. A volume hologram can be formed by subjecting a photosensitive material, such as a photographic sensitive material for holograms, a phase separation type photopolymer, an HPDLC (holographic polymer-dispersed liquid crystal), or a photolithographic material, to multiple-beam interference exposure.

Next, the sixth embodiment of the invention will be explained which is a total-reflection optical member having a simpler and more inexpensive constitution formed using neither the optical interference filter nor Bragg reflection filter described above.

Figure 21:
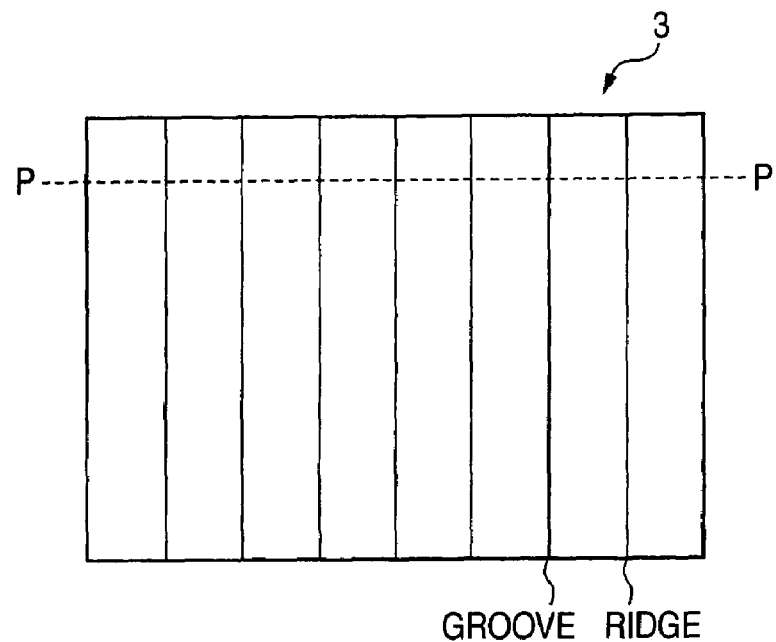
FIG. 21 is views illustrating a total-reflection optical member according to a sixth embodiment of the invention, which comprises prisms.
Figure 21:
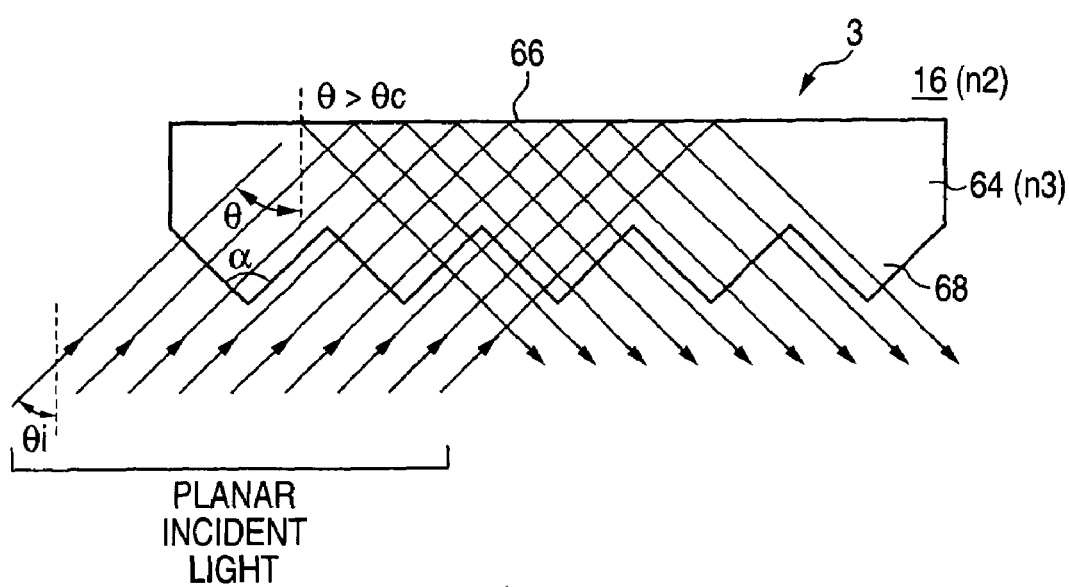

In this embodiment, the total-reflection optical member comprises prisms. An example of the constitution of the total-reflection optical member in this case is shown in FIG. 21. The total-reflection optical member 3 according to this modification comprises a microprism array 64 having a corrugated surface on the incident-light introduction side. FIG. 21(a) is a plan view of the microprism array 64 viewed from the light incidence side, and FIG. 21(b) is a sectional view taken on P—P of (a).

The microprism array 64 has a flat shape. The upper side thereof serves as a smooth total reflection plane 66, while the lower side thereof has a contour made by arranging, in parallel, prisms 68 having a conical section.

Usable as the material of this microprism array 64 are glasses, resins, and the like. Especially from the standpoint of suitability for mass production, resins are preferred. Optically preferred resins are acrylic, epoxy, polyester, polycarbonate, styrene, and vinyl chloride resins and the like. The resin materials include the photocurable type, photosoluble type, thermosetting type, thermoplastic type, and the like, and a suitable one can be selected.

A preferred process for producing the microprism array 64 from the standpoint of productivity are casting with a mold, press forming with heating, injection molding, printing, or photolithography. Specifically, the microprism array can be molded by pressing a thermoplastic resin with a mold having the shape of the microprisms. Alternatively, the array can be molded by charging a photocurable resin or thermosetting resin into a mold, subsequently curing the resin with light or heat, and taking the cured resin out of the mold.

In photolithography, a photosoluble resin or photocurable resin is exposed to ultraviolet (or visible rays) through a suitably patterned shielding mask and the exposed areas or unexposed areas, respectively, are dissolved away by development to thereby form microprisms. Microprisms of a desired shape can be obtained by selecting a resin material and a distribution of exposure amount. Some resin materials can give a microprism array 64 having a desired shape based on surface tension during thermal softening in a high-temperature baking treatment conducted after development.

The incident light is planar light whose incidence angles are within a specific range. As shown in FIG. 21(b), the light is caused to strike on the total-reflection optical member 3 at an incidence angle of $\theta_i$.

In the total-reflection optical member 3 according to this embodiment, when the medium 16 surrounding the microprism array 64 is air (refractive index n2=1) and the microprism array 64 is made of a transparent resin (refractive index n3= 1.5), then the critical total reflection angle $\theta_c$ at the total reflection plane 52, which is determined in the same manner as with equation (1) given above, is 42 [deg].

Consequently, in this embodiment, each prism has been regulated so as to have an apex angle α of around 90 [deg] and left and right angles of around 45 [deg] each so as to obtain an angle of incidence θ on the total reflection plane 52 of $\theta \geq \theta_c$. In this case, when incident light is introduced from outside the prism, this incident light has an incidence angle $\theta_i$ of around 45 [deg]. Under these conditions, substantially no optical eclipse occurs and incident light can be totally reflected at the total reflection plane 52 at a high efficiency. The value of apex angle α of each prism is not limited to that value.

By thus using the microprism array 64, which can be easily mass-produced at low cost, to introduce incident light which is striking as planar light, substantially all the incident light introduced can be totally reflected.

Figure 22:
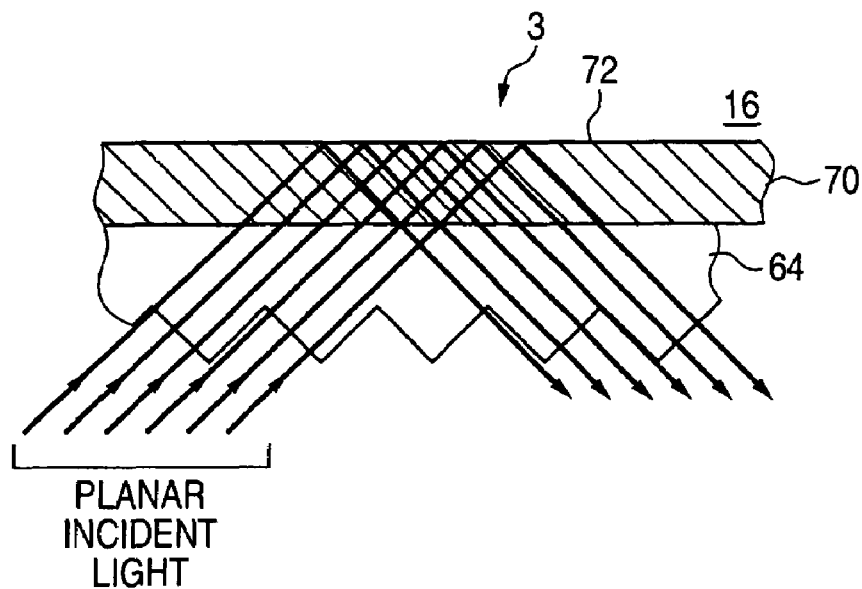
FIG. 22 is a view illustrating the sectional constitution of a total-reflection optical member obtained by bonding a microprism array to a transparent medium.

Use may be made of a constitution which includes a transparent medium made of a glass, a resin, or the like disposed on the light-path front side of this microprism array 64. A sectional constitution of the total-reflection optical member in this case is shown in FIG. 22.

According to this constitution, planar incident light strikes on the microprism array 64 and incident light comprising components having a given incidence angle determined by factors including the apex angle α of each prism is introduced through the microprism array 64 into the transparent medium 70. The incident light thus introduced is totally reflected at the total reflection plane 72 of the transparent medium 70 at a high efficiency. Because of this, substantially all the incident light introduced can be totally reflected at the total reflection plane 72 of the transparent medium 70 as in the case described above.

An optical element which changes a light path according to the angle of light incidence on the microprism array 64 may be further disposed on the light-path front side of that structure obtained by bonding the microprism array 64 to the transparent medium 70 to thereby constitute a total-reflection optical member.

Figure 23:
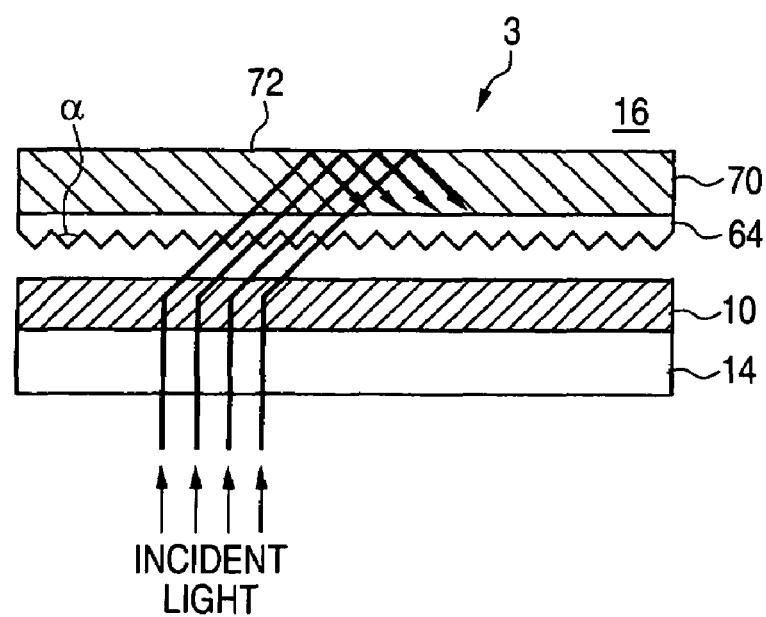
FIG. 23 is a view illustrating the sectional constitution of a total-reflection optical member which comprises a structure obtained by bonding a microprism array to a transparent medium and, disposed on the light-path front side of the structure, an optical element which changes a light path to an angle according to an angle of incidence for the microprism array.

A sectional constitution of the total-reflection optical member 3 in this case is shown in FIG. 23. The total-reflection optical member 3 is constituted of, superposed in this order from the incident-light introduction side, a transparent medium 14 such as, e.g., a glass substrate or a transparent resin, a light path-changing optical element 10 such as, e.g., a transmission type diffraction grating, a microprism array 64, and a transparent medium 70. The incident light is planar light whose incidence angles are within a specific range. The light path-changing optical member 10 can preferably be a volume hologram when it is a transmission type diffraction grating. However, the optical member 10 may be a relief type diffraction grating, refractive-index distribution type diffraction grating, or amplitude-modulating diffraction grating.

According to this constitution, when planar incident light which is collimated light strikes on the total-reflection optical member 3, then the incident light passes through the transparent medium 14 and is changed in light path, by the light path-changing optical element 10, so as to comprise components having a given incidence angle determined by factors including the apex angle α of the microprism array 64. Namely, the light path is changed so as to have an angle satisfying a condition of total reflection at the total reflection plane 72 of the transparent medium 70. In other words, the light path-changing optical element 10 has been designed so that incident light comes to have an incidence angle at which the light is totally reflected at the total reflection plane 72 of the transparent medium 70. Thus, the incident light introduced can be totally reflected at the total reflection plane 72 of the transparent medium 70.

Figure 24:
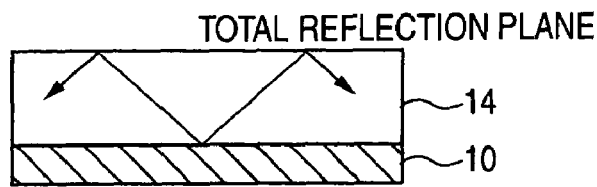
FIG. 24 is views respectively illustrating other constitution examples of the total-reflection optical member.
Figure 24:
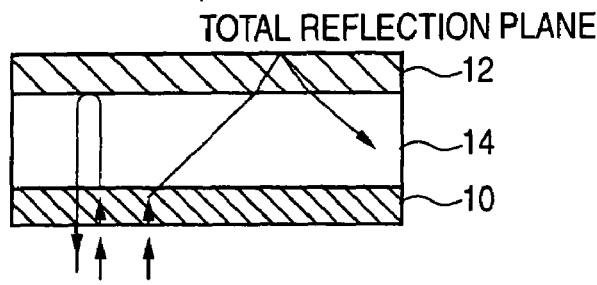
Figure 24:
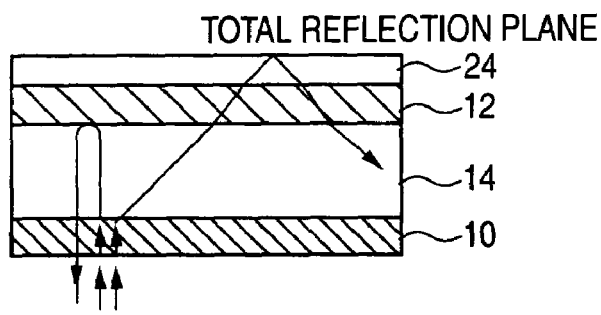
Figure 24:
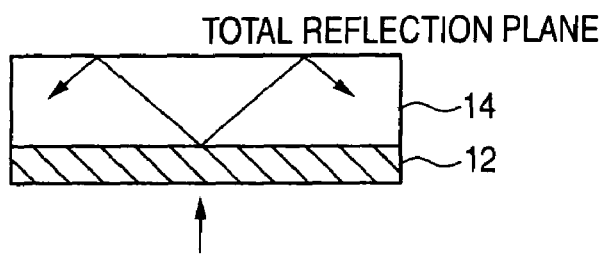
Figure 24:
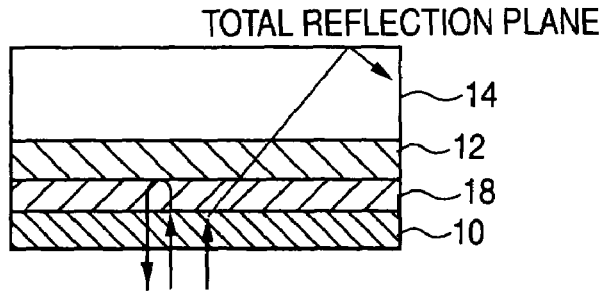
Figure 24:
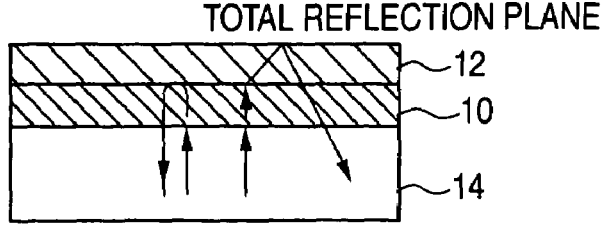

Examples of other constitutions of the total-reflection optical member 2 for use in the embodiments described above are briefly explained below with reference to FIG. 24.

First, the total-reflection optical member shown in FIG. 24(a) is a structure comprising, superposed in this order from the incident-light introduction side, a light path-changing optical element 10 and a transparent medium 14 having a total reflection plane. In this total-reflection optical member, the light path-changing optical element 10 has been designed so that incident light is totally reflected at the total reflection plane 22 which is the light-path front side of the transparent medium 14.

According to this total-reflection optical member, when incident light strikes thereon, it is changed in light path, by the light path-changing optical element 10, so as to comprise incidence angle components which are totally reflected at the total reflection plane of the transparent medium 14. This transmitted light whose light path has been changed is totally reflected at the total reflection plane 22.

Next, the total-reflection optical member shown in FIG. 24(b) is a structure comprising, superposed in this order from the incident-light introduction side, a light path-changing optical element 10, a transparent medium 14, and a light path-selecting optical element 12 having a total reflection plane. In this total-reflection optical member, the light path-changing optical element 12 has been designed so that incident light is totally reflected at the total reflection plane which is the light-path front side of the light path-selecting optical element 12.

According to this total-reflection optical member, when incident light strikes thereon, the light path of the incident light is changed by the light path-changing optical element 10. The light which has thus come to comprise incidence angle components capable of being totally reflected at the total reflection plane is introduced into the light path-selecting optical element 12 and totally reflected at the total reflection plane. On the other hand, the light comprising components having any other incidence angle is not introduced into the light path-selecting optical element 12 but selectively reflected and returned to the incident-light introduction side.

The total-reflection optical member shown in FIG. 24(c) has a constitution obtained by modifying the total-reflection optical member shown in FIG. 24(b) by disposing, on the light-path front side thereof, a transparent medium 24 having a refractive index lower than the refractive index of the transparent medium 14. In this case, the light path-selecting optical element 12 has been designed so as to enable incident light to be totally reflected at the total reflection plane which is the light-path front side of the transparent medium 24.

According to this total-reflection optical member, when incident light is introduced through the light path-changing optical element 10 and the transparent medium 14, then the incident light introduced into the light path-selecting optical element 12 is totally reflected at the total reflection plane which is the light-path front side of the transparent medium 24. On the other hand, the light comprising components having any other incidence angle is not introduced into the light path-selecting optical element 12 but selectively reflected and returned to the incident-light introduction side.

Next, the total-reflection optical member shown in FIG. 24(d) is a structure comprising, superposed in this order from the incident-light introduction side, a light path-selecting optical element 12 and a transparent medium 14 having a total reflection plane. In this total-reflection optical member, the light path-selecting optical element 12 has been designed so as to enable incident light to be totally reflected at the total reflection plane which is the light-path front side of the transparent medium 14.

According to this total-reflection optical member, when incident light strikes thereon, the light path-selecting optical element 12 transmits only the light comprising incidence angle components which are totally reflected at the total reflection plane of the transparent medium 14. This transmitted light is totally reflected at the total reflection plane. On the other hand, the incident light components which do not satisfy a condition of total reflection are selectively reflected by the light path-selecting optical element 12 and are substantially prevented from passing through the total-reflection optical member.

Next, the total-reflection optical member shown in FIG. 24(e) is a structure comprising, superposed in this order from the incident-light introduction side, a light path-changing optical element 10, an optically connecting medium 18 serving as an optical adhesive layer, a light path-selecting optical element 12, and a transparent medium 14. According to this total-reflection optical member, when incident light strikes thereon, it is changed in light path, by the light path-changing optical element 10, so as to comprise incidence angle components which are totally reflected at the total reflection plane of the transparent medium 14. This light whose light path has been changed is totally reflected at the total reflection plane. On the other hand, the incident light components which do not satisfy a condition of total reflection are selectively reflected by the light path-selecting optical element 12 and are substantially prevented from passing through the total-reflection optical member.

Next, the total-reflection optical member shown in FIG. 24(f) is a structure comprising, superposed in this order from the incident-light introduction side, a transparent medium 14, a light path-changing optical element 10, and a light path-selecting optical element 12. According to this total-reflection optical member, when incident light strikes thereon, the incident light is introduced into the light path-changing optical element 10 through the transparent medium 14. The light introduced is changed in light path, by the light path-changing optical element 10, so as to comprise incidence angle components which are totally reflected at the total reflection plane. On the other hand, the incident light components which do not satisfy a condition of total reflection are selectively reflected by the light path-selecting optical element 12 and are substantially prevented from passing through the total-reflection optical member.

Even the total-reflection optical members having the constitutions described above can be applied to the total-reflection optical members according to the embodiments described above and can produce the same effect and advantage. The layer constitutions of the total-reflection optical members are not particularly limited as long as the functions according to the spirit described above are brought about.

An explanation is given below on a specific constitution example of the total-reflection optical members and on the results of a simulation for determining the spectral transmittance of the optical member in this constitution example.

Figure 25:
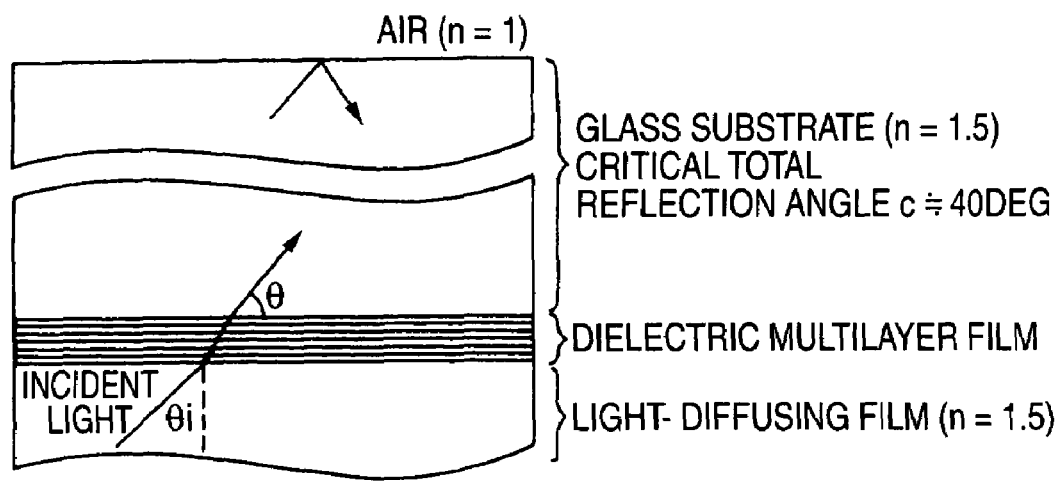
FIG. 25 is a view illustrating a specific constitution example of the total-reflection optical member.

In FIG. 25 is shown a constitution example of the total-reflection optical members. The total-reflection optical member in this case comprises, superposed in this order from the incident-light introduction side, a light-diffusing film (refractive index n=1.5) as a light path-changing optical element, a dielectric multilayer film as a light path-selecting optical element, and a glass substrate (refractive index n=1.5). Air (refractive index n=1.0) is present on the light-path front side of the glass substrate.

Figure 26:
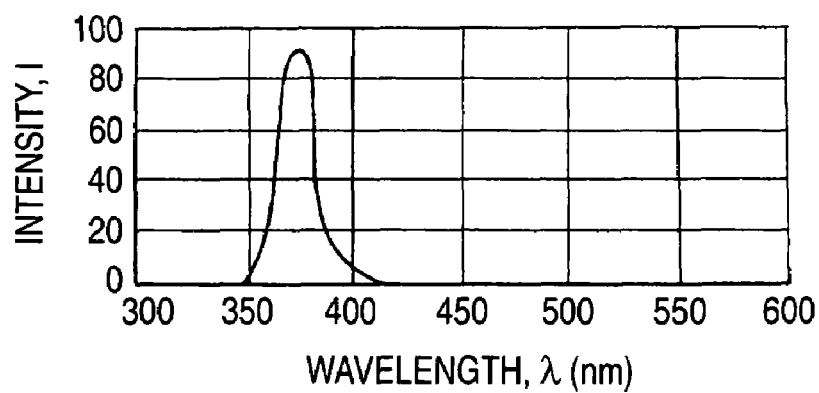
FIG. 26 is a graph showing the wavelength region of incident light.

The dielectric multilayer film is a multilayer film having a 29-layer structure composed of $TiO_2/SiO_2/\ldots/SiO_2/TiO_2$, in which the optical thickness of each layer has been regulated to ¼λ (provided that the wavelength λ=440 [nm]). The incident light used was UV light having wavelengths λ=350 to 400 [nm] as shown in FIG. 26. The critical total reflection angle $\theta_c$ in this case is about 40 [deg]).

Figure 27:
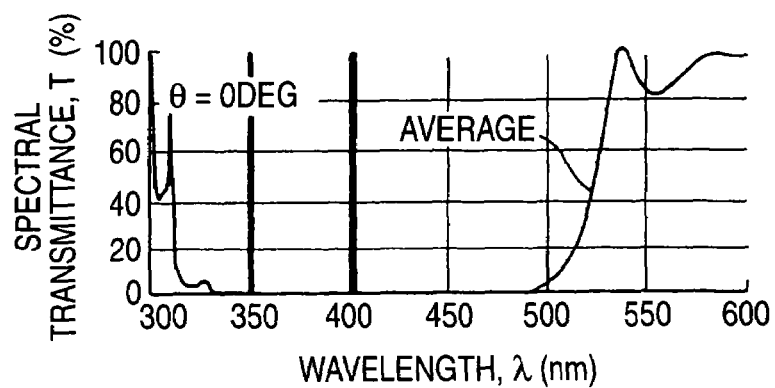
FIG. 27 is graphs showing changes of spectral transmittance T with wavelength $\lambda$ with respect to each incidence angle $\theta$.
Figure 27:
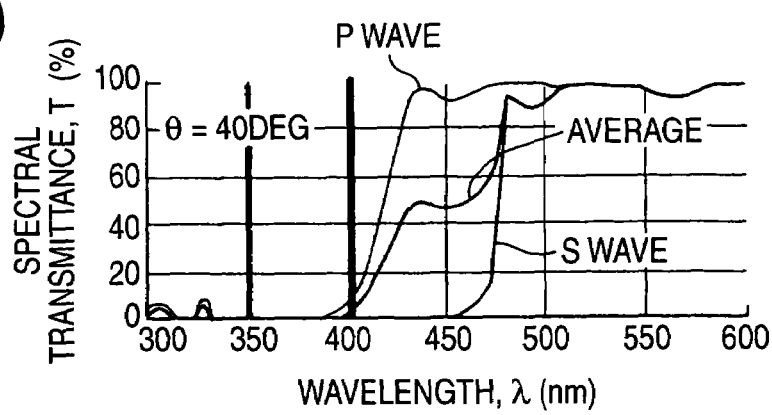
Figure 27:
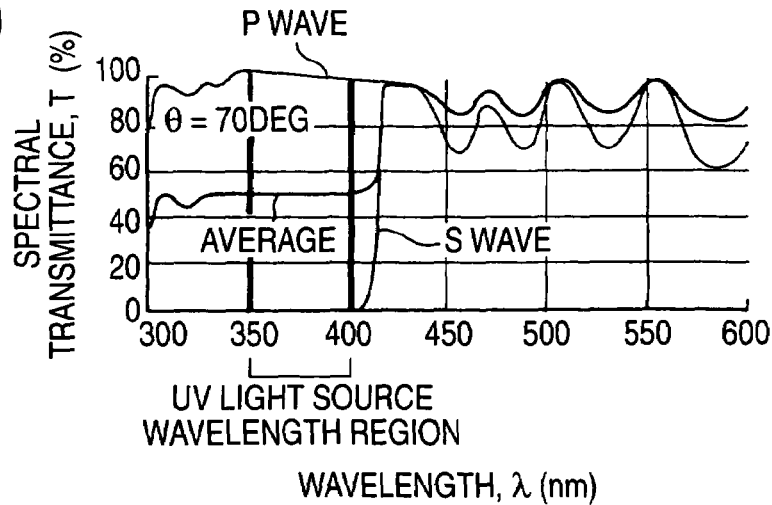
Figure 28:
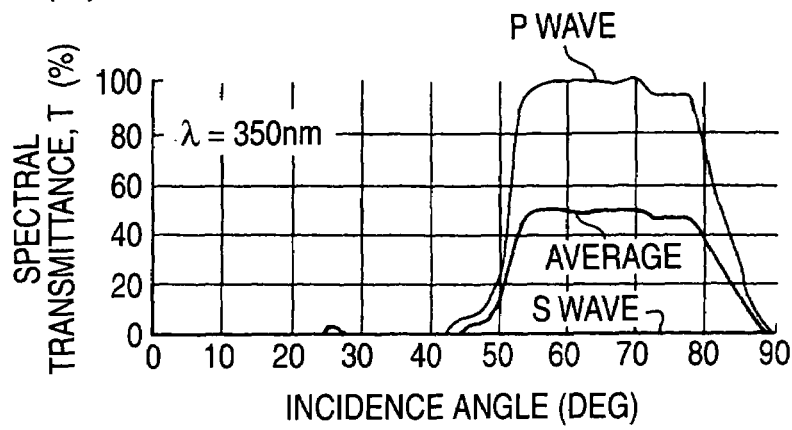
FIG. 28 is graphs showing the relationship between incidence angle $\theta$ and spectral transmittance T with respect to each wavelength $\lambda$.
Figure 28:
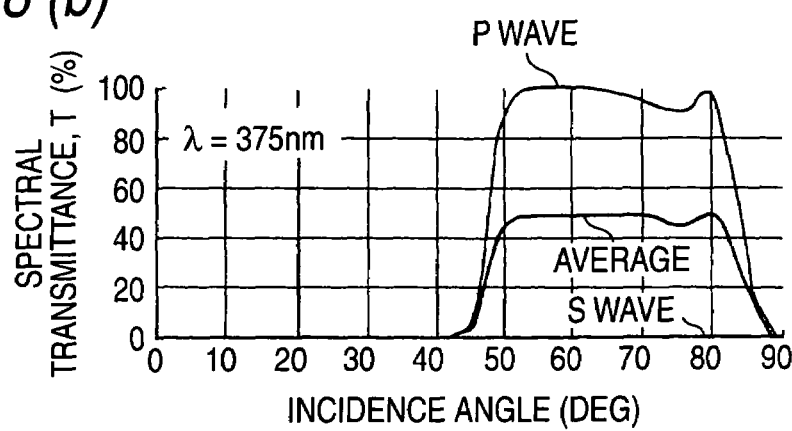
Figure 28:
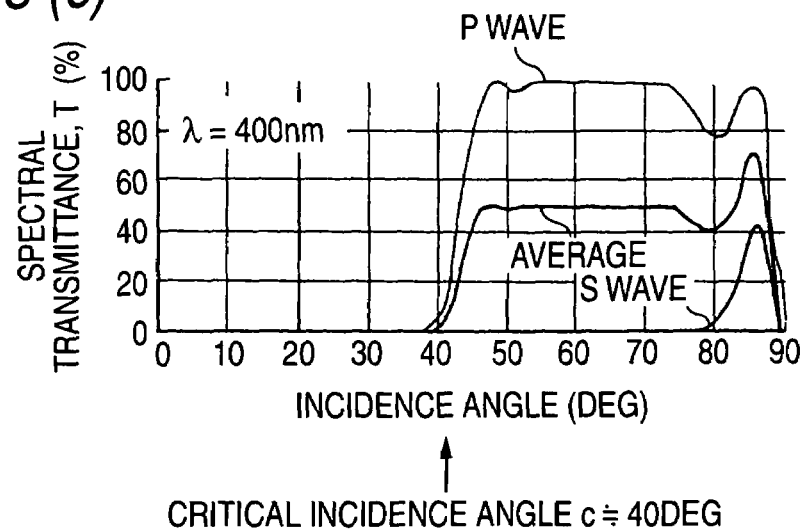
Figure 29:
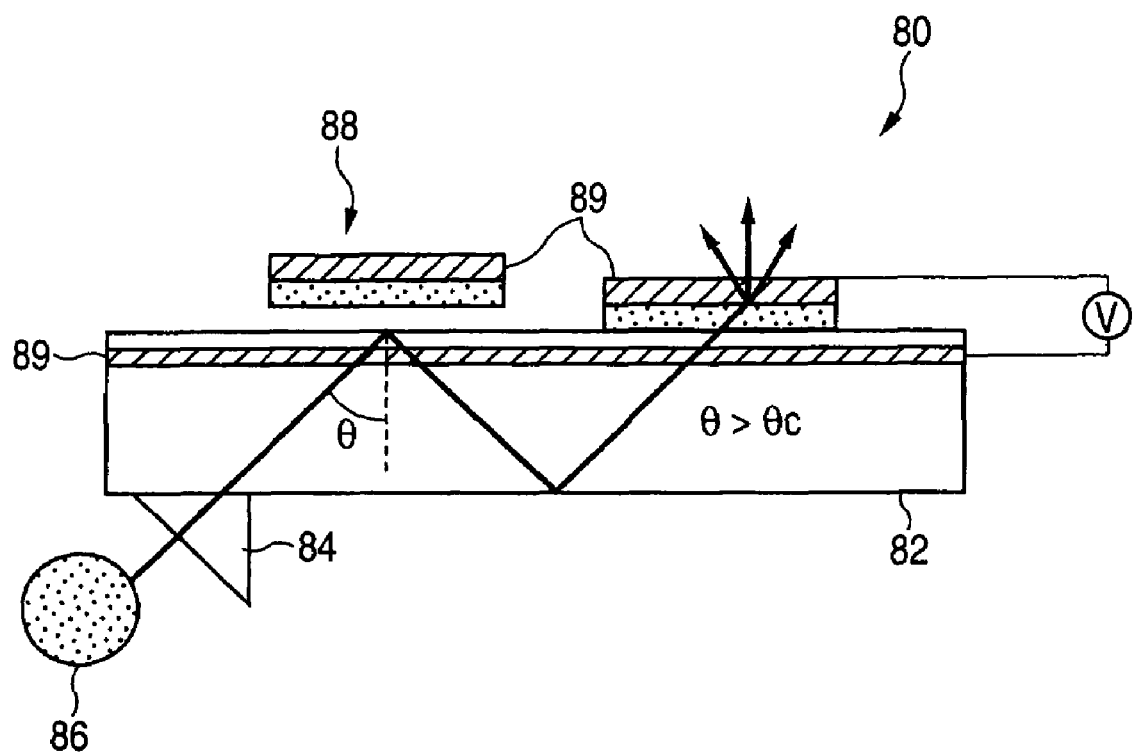
FIG. 29 is a sectional view of part of an existing flat display element of the lightguide plate type.
Figure 30:
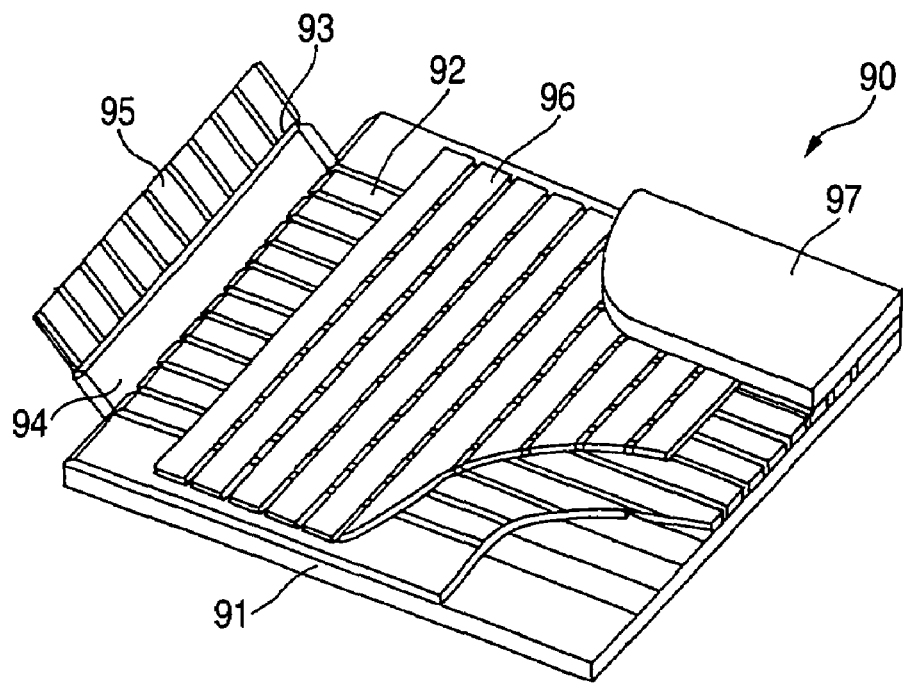
FIG. 30 is a view illustrating the constitution of an existing flat display element.
Figure 31:
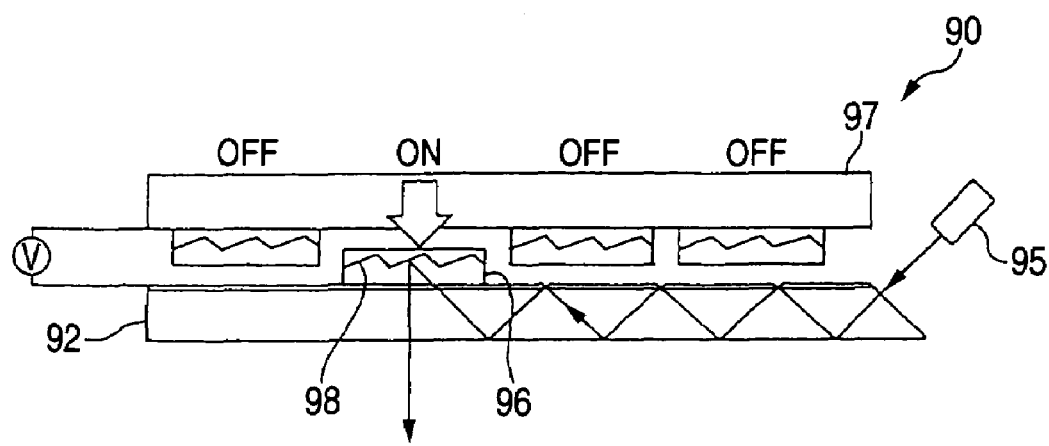
FIG. 31 is a view illustrating an action of the flat display element of FIG. 30.

Under those conditions, the spectral transmittance of the optical member (dielectric multilayer film) was determined. The results obtained are shown in FIG. 27 and FIG. 28. FIG. 27 is graphs showing changes of spectral transmittance T with wavelength λ with respect to each incidence angle θ, while FIG. 28 is graphs showing the relationship between incidence angle θ and spectral transmittance T with respect to each wavelength λ.

As shown in FIG. 27(a), when the incidence angle θ is 0 [deg], the spectral transmittance T in the wavelength region for the UV light is about 0[%], showing that the light does not pass through the optical member. When the incidence angle θ is 40 [deg], which is just before the critical total reflection angle $\theta_c$, as shown in FIG. 27(b), then the light does not pass through the optical member in this case also. When the incidence angle θ is 70 [deg] as shown in FIG. 27(c), the spectral transmittance for P wave is about 100[%] and that for S wave is about 0[%]. The average for P wave and S wave is about 50[%].

Furthermore, as shown in FIG. 28(a), when the wavelength λ is 350 [deg], which is on the shorter-wavelength side in the wavelength region for the UV light, then the spectral transmittance for P wave improves as the incidence angle θ increases beyond about 50 [deg]. In the case of the center wavelength, i.e., λ=375 [nm], as shown in FIG. 28(b), the spectral transmittance improves as the incidence angle θ increases beyond about 46 [deg]. Furthermore, when the wavelength λ is 400 [nm], which is on the longer-wavelength side, as shown in FIG. 28(c), then the spectral transmittance improves as the incidence angle θ increases beyond about 42 [deg].

Consequently, by using P wave so as to be totally reflected by the optical member or by suitably designing the optical member by modifying various conditions thereof so as to obtain spectral characteristics for S wave which are akin to those for P wave, incident light having a wavelength in the wavelength region for a UV light can be made to be selectively reflected when the incidence angle θ thereof is not larger than the critical total reflection angle θ and be transmitted when the incidence angle θ thereof is larger than the critical total reflection angle $\theta_c$. Thus, the dielectric multilayer film in the optical member can be made to practically sufficiently function as a light path-selecting optical element S.

In the explanation given above, a multilayer film consisting of $TiO_2/SiO_2$ was shown as an example of the dielectric multilayer film. However, it is preferred to suitably select the materials thereof according to the wavelengths of the light to be used. For example, preferred examples for visible light and infrared include:
materials having a high refractive index (materials having a refractive index of about 1.8 or higher) such as
$TiO_2$, $CeO_2$, $Ta_2O_5$, $ZrO_2$, $Sb_2O_3$, $HfO_2$, $La_2O_3$, $NdO_3$, $Y_2O_3$, $ZnO$, and $Nb_2O_5$;
materials having a relatively high refractive index (materials having a refractive index of about from 1.6 to 1.8) such as
$MgO$, $Al_2O_3$, $CeF_3$, $LaF_3$, and $NdF_3$; and
materials having a low refractive index (materials having a refractive index of about 1.5 or lower) such as
$SiO_2$, $AlF_3$, $MgF_2$, $Na_3AlF_6$, $NaF$, $LiF$, $CaF_2$, and $BaF_2$.
Preferred examples for ultraviolet include:
materials having a high refractive index (materials having a refractive index of about 1.8 or higher) such as
$ZrO_2$, $HfO_2$, $La_2O_3$, $NdO_3$, and $Y_2O_3$
or
$TiO_2$, $Ta_2O_5$, and $ZrO_2$
(provided that the wavelengths of the light are about from 360 nm to 400 nm);
materials having a relatively high refractive index (materials having a refractive index of about from 1.6 to 1.8) such as
$MgO$, $Al_2O_3$, $LaF_3$, and $NdF_3$; and
materials having a low refractive index (materials having a refractive index of about 1.5 or lower) such as
$SiO_2$, $AlF_3$, $MgF_2$, $Na_3AlF_6$, $NaF$, $LiF$, and $CaF_2$.

While the invention has been described in detail and with reference to specific embodiments thereof, it will be apparent to one skilled in the art that various changes and modifications can be made therein without departing from the spirit and scope thereof.

This application is based on a Japanese patent application filed on Jul. 19, 2001 (Patent Application 2001-220044), the contents thereof being hereby incorporated by reference.

Industrial Applicability

The light-modulating element according to the invention comprises: a total-reflection optical member having such a property that at least part of incident light introduced as planar light into the light-modulating element is totally reflected at an interface of a layer constituted by the light-modulating element and the incident light does not substantially go out through the side opposite to the incident-light introduction side; and light-coupling elements which are disposed on the total reflection plane side of the total-reflection optical member and serve to selectively couple with the incident light and take out the same from the total reflection plane. Due to this constitution, when incident light introduced as planar light strikes on the total-reflection optical member, then the incident light is introduced into the total-reflection optical member and at least part of the incident light introduced is totally reflected at an interface of a layer constituted by the light-modulating element, while the incident light does not substantially go out through the side opposite to the incident-light introduction side. When light-coupling elements serving to couple with incident light and take out the same are selectively disposed close to the total reflection plane of this total-reflection optical member, then the light to be totally reflected is taken out by the light-coupling elements disposed close and is emitted toward the incident light light-path front side. Thus, planar incident light can be introduced into the light-modulating element at a high efficiency while retaining the planar state and light modulation can be selectively conducted according to the state of the close disposition of light-coupling elements. Consequently, light modulation with an elevated energy efficiency is possible without using a display technique employing a waveguide or lightguide plate.

The display element according to the invention comprises the light-modulating element described above and a flat light source. Due to this constitution, when the incident light emitted by the flat light source is introduced into the light-modulating element, then the light introduced into the total-reflection optical member of the light-modulating element can be modulated by light-coupling elements and selectively emitted to the light-path front side. Thus, a high-quality image can be produced at a high efficiency.

The exposure element according to the invention employs the display element described above and light modulation is conducted therein based on predetermined exposure data. Due to this constitution, light is directed selectively toward a work to be exposed and the work to be exposed can be exposed.

The invention claimed is:

1. A light-modulating element having a flat shape, which comprises:
    a total-reflection optical member having such a property that at least part of incident light introduced into the light-modulating element is totally reflected at an total reflection plane provided at a side opposite to the incident-light introduction side and the incident light does not substantially go out through a side opposite to the incident-light introduction side; and
    a light-coupling element which is disposed on the total reflection plane side of the total-reflection optical member and serves to selectively couple with the incident light and take out the same from the total reflection plane;
    wherein the total-reflection optical member has, disposed therein, an optical element which selects a light path, and that at least part of the planar incident light introduced into the total-reflection optical member is introduced into the optical element selecting a light path and substantially all the incident light thus introduced is reflected by total reflection at an interface of a layer constituted by the total-reflection optical member.

2. The light-modulating element of claim 1, wherein the light-modulating element has a transparent medium constituting part of the total-reflection optical member and the optical element selecting a light path has been disposed on the light-path front side of the transparent medium.

3. The light-modulating element of claim 1, wherein the optical element selecting a light path has such a property that substantially all the transmitted light emitted by the optical element has components having an angle larger than the critical total reflection angle at an interface of a layer disposed on the incident light light-path front side of the optical element selecting a light path or at the interface of the incident light light-path front side of the optical element selecting a light path and the incident light components having any other angle are selectively reflected and are not transmitted therethrough.

4. The light-modulating element of claim 1, wherein the optical element selecting a light path transmits substantially all light having an angle θs satisfying the requirement $\sin\theta s > nw/ns$ wherein ns is the average refractive index of the optical element selecting a light path, nw is the refractive index of the medium disposed on the light-path front side of the total reflection plane, and θs is the angle of the light passing through the medium of the optical element selecting a light path.

5. The light-modulating element of claim 1, wherein the optical element selecting a light path functions to reflect incident light selectively with respect to wavelength region, and that as the incidence angle of the light striking on the optical element selecting a light path with the plane of the optical element becomes smaller, the wavelength of the incident light selectively reflected shifts to the shorter-wavelength side.

6. The light-modulating element of claim 1, wherein when the incidence angel of the light striking on the optical element selecting a light path is regulated so that the angle of incidence on the total reflection plane on the incident light light-path front side is not larger than the critical total reflection angle, then the optical element selecting a light path selectively reflects substantially all the incident light.

7. The light-modulating element of claim 1, wherein the optical element selecting a light path is an optical interference filter comprising a dielectric multilayer film.

8. The light-modulating element of claim 1, wherein the optical element selecting a light path is a Bragg reflection filter comprising either a cholesteric liquid crystal or a volume hologram.

9. A light-modulating element having a flat shape, which comprises:
　a total-reflection optical member having such a property that at least part of incident light introduced into the light-modulating element is totally reflected at an total reflection plane provided at a side opposite to the incident-light introduction side and the incident light does not substantially go out through a side opposite to the incident-light introduction side; and
　a light-coupling element which is disposed on the total reflection plane side of the total-reflection optical member and serves to selectively couple with the incident light and take out the same from the total reflection plane;
　wherein the total-reflection optical member has an optical element changing a light path and an optical element selecting a light path which are disposed in this order from the incident-light introduction side in the direction of the thickness of the total-reflection optical member, and that when planar incident light is introduced into the optical element changing a light path, then at least part of the incident light introduced is introduced into the optical element selecting a light path and substantially all the incident light thus introduced is reflected by total reflection at an interface of a layer constituted by the light-modulating element.

10. The light-modulating element of claim 9, wherein the optical element changing a light path and the optical element selecting a light path are in optical contact with each other.

11. The light-modulating element of claim 9, wherein the optical element changing a light path and the optical element selecting a light path are in optical contact with each other through a medium having a refractive index higher than 1.

12. The light-modulating element of claim 9, wherein the light-modulating element has a transparent medium constituting part of the total-reflection optical member, and the optical element changing a light path and the optical element selecting a light path have been disposed in this order on the light-path front side of the transparent medium.

\* \* \* \* \*